(12) United States Patent
Ishizaki et al.

(10) Patent No.: US 6,516,278 B1
(45) Date of Patent: Feb. 4, 2003

(54) VEHICLE HOOD OPERATING SYSTEM

(75) Inventors: Tatsuya Ishizaki, Wako (JP); Kaoru Nagatomi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 8 days.

(21) Appl. No.: 09/662,190

(22) Filed: Sep. 15, 2000

(30) Foreign Application Priority Data

Sep. 16, 1999 (JP) .......................................... 11-262768
Sep. 16, 1999 (JP) .......................................... 11-262770

(51) Int. Cl.$^7$ .............................................. G06F 17/00
(52) U.S. Cl. ........................... 702/33; 701/45; 702/142; 180/274
(58) Field of Search .............................. 701/70, 71, 75, 701/78, 79, 81; 702/33, 85, 105, 113, 142; 180/271, 274, 281; 280/748; 296/189, 194

(56) References Cited

U.S. PATENT DOCUMENTS

| | | | | |
|---|---|---|---|---|
| 3,709,316 A | * | 1/1973 | Glance | 180/69.21 |
| 4,042,057 A | * | 8/1977 | Beckley | 180/90 |
| 4,249,632 A | * | 2/1981 | Lucchini et al. | 180/274 |
| 6,182,782 B1 | * | 2/2001 | Matsuura et al. | 180/274 |
| 6,217,108 B1 | * | 4/2001 | Sasaki | 296/194 |
| 6,293,362 B1 | * | 9/2001 | Sasaki et al. | 180/274 |
| 6,330,500 B1 | * | 12/2001 | Moriyama et al. | 701/45 |
| 6,332,115 B1 | * | 12/2001 | Nobusawa et al. | 702/142 |

FOREIGN PATENT DOCUMENTS

| | | |
|---|---|---|
| DE | 43 24 753 | 7/1993 |
| DE | 197 10 417 | 3/1997 |
| DE | 197 21 565 | 5/1997 |
| EP | 0 914 992 | 10/1998 |
| JP | 08216826 | 8/1996 |

* cited by examiner

Primary Examiner—John S. Hilten
Assistant Examiner—John Le
(74) Attorney, Agent, or Firm—Merchant & Gould, P.C.

(57) ABSTRACT

A vehicle hood operating system has a control unit for controlling an actuator which is designed to lift a hood over a vehicle when an obstacle with which the vehicle has collided is an object to be protected. The control unit controls the actuator such that it lifts the hood when the velocity of the vehicle is equal to, or higher than, a predetermined value at the time of its collision, while at the same time, the speed of deformation caused to a bumper by the collision is equal to, or higher than, its threshold value varying with the vehicle velocity. When the vehicle velocity is lower than the predetermined value, the object to be protected is unlikely to strike against the hood. As the threshold value varies with the vehicle velocity, it is possible to distinguish quickly and accurately if the obstacle is an object to be protected, or not.

8 Claims, 19 Drawing Sheets

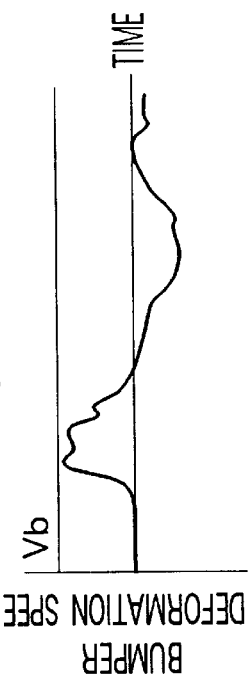
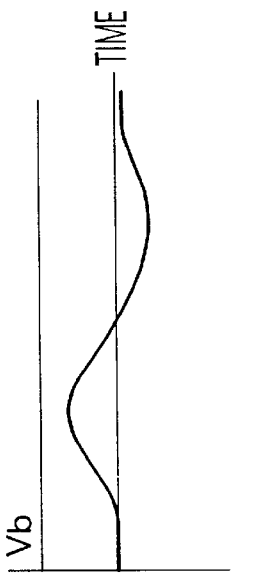
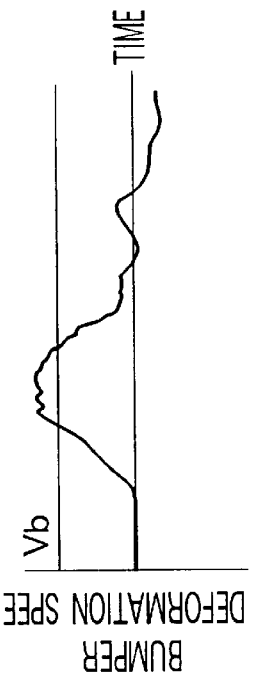
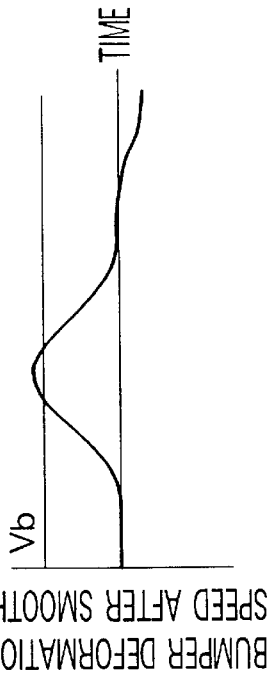

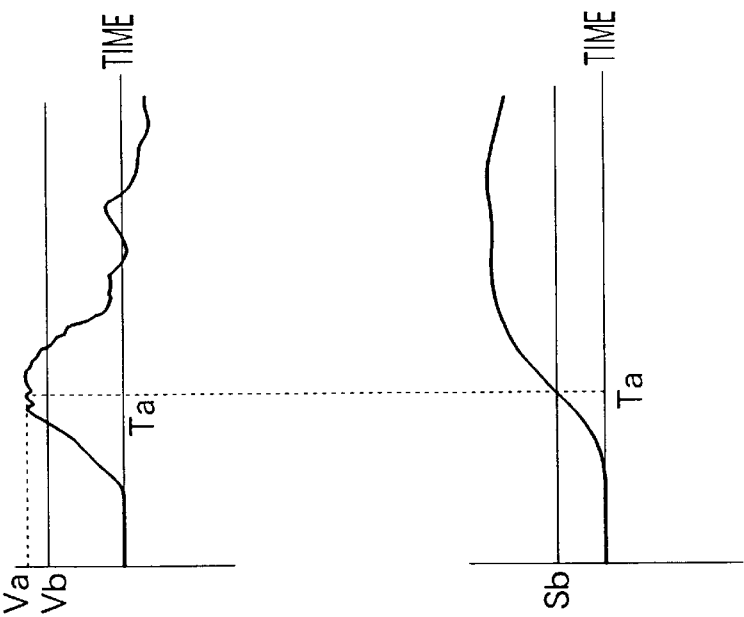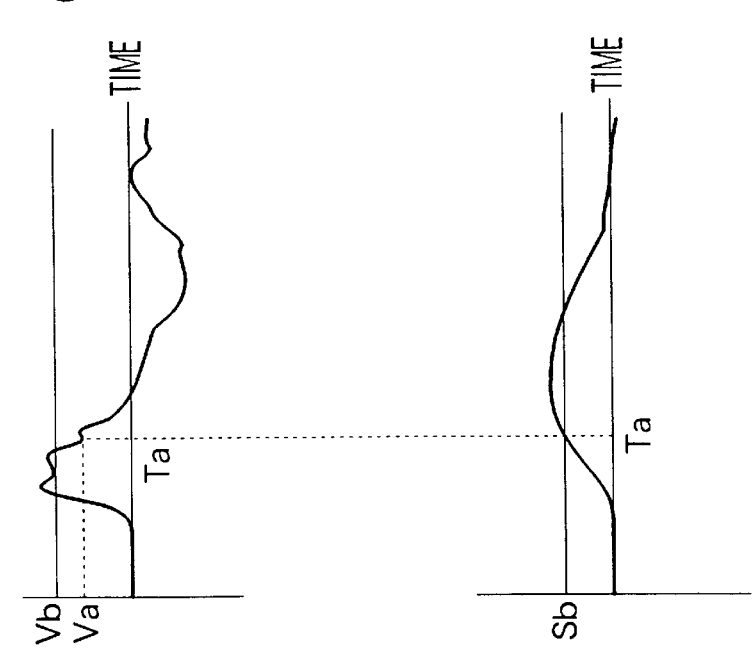

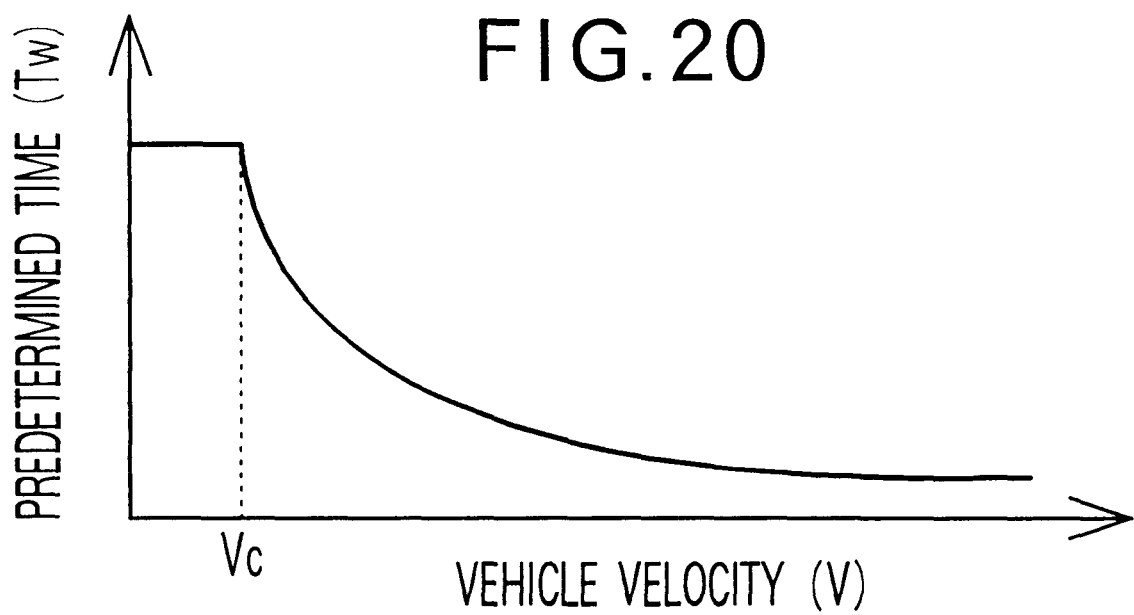

VEHICLE HOOD OPERATING SYSTEM

BACKGROUND OF THE INVENTION

1. Field of the Invention

This invention relates to a system for operating a vehicle hood and, more particularly, to a system which can distinguish a collision of a vehicle carrying the system with an object to be protected (e.g., a pedestrian) from a collision of the vehicle with any other object for operating a hood of the vehicle.

2. Description of the Related Art

As a vehicle hood operating system of that type, there is known a hood airbag sensor system as disclosed in, e.g., Japanese Patent Laid-Open Publication No. HEI-8-216826. The known hood operating system has a bumper sensor installed on the front bumper of a vehicle for detecting a substantially horizontal front load and a hood sensor installed above the front portion of a hood for detecting a substantially vertical downward load. If the vehicle collides with an object to be protected, the bumper sensor responds, and the object striking against the hood produces a downward load acting upon the hood sensor, whereby the hood airbag is actuated. If the vehicle collides with an obstacle like a building, however, the hood airbag is not actuated, since no vertical downward load acts upon the hood sensor to place it in operation.

The hood operating system as described does, however, not allow the hood airbag to be actuated until a vertical downward force is produced when the obstacle is an object to be protected, though it may make it possible to avoid any unnecessary outputting of a signal for actuating the hood airbag when the obstacle is, e.g., a building. As a result, the actuation of the hood airbag is delayed. Moreover, it is likely that the hood airbag may be actuated even when an object which is not an object to be protected, but which is lighter in weight, has produced a vertical force by striking against the front bumper.

SUMMARY OF THE INVENTION

It is therefore an object of the present invention to provide a vehicle hood operating system which can operate a vehicle hood quickly, while making a judgment of higher accuracy as to any obstacle.

According to a first aspect of this invention, there is provided a vehicle hood operating system comprising: a velocity sensor for detecting a velocity of a vehicle, an acceleration sensor for detecting acceleration caused by an external force directed from a front to a back of the vehicle to to act upon a bumper; a calculation unit for calculating a bumper deformation speed by converting the acceleration detected by the acceleration sensor to a speed, an actuator for lifting a hood a predetermined amount; and a control unit for controlling the actuator such that the actuator lifts the hood when the vehicle velocity detected by the velocity sensor has exceeded a predetermined threshold value, while at the same time, the bumper deformation speed calculated by the calculation unit has exceeded a threshold value varying with the vehicle velocity.

When the vehicle has collided with an obstacle, the system according to the first aspect of this invention can distinguish between two kinds of obstacles accurately in a short time after the collision, since it relies for their distinction upon the bumper deformation speed differing markedly between when the obstacle is an object to be protected, and when it is another object of lighter weight. The bumper deformation speed is high when the obstacle is an object to be protected, but is low when it is another object of lighter weight. If the vehicle has a low velocity not exceeding a predetermined value when it has collided with an obstacle, the actuator is not operated, since there is no high possibility of any secondary collision.

Preferably, the system further includes a memory storing a map containing the threshold value of the bumper deformation speed varying with the vehicle velocity. The threshold value of the bumper deformation speed in the map so varies as to increase with an increase of the vehicle velocity, thereby enabling an accurate distinction of obstacles despite the bumper deformation speed varying with the vehicle velocity prevailing at the time of collision.

According to a second aspect of the present invention, there is provided a vehicle hood operating system comprising: a velocity sensor for detecting a velocity of a vehicle, an acceleration sensor for detecting acceleration caused by an external force directed from a front to a back of the vehicle to act upon a bumper; a first calculation unit for calculating a bumper deformation speed by converting the acceleration detected by the acceleration sensor to a speed; a second calculation unit for calculating an amount of bumper deformation from the bumper deformation speed calculated by the first calculation unit; an actuator for lifting the hood a predetermined amount; and a control unit for controlling the actuator such that the actuator lifts the hood when the vehicle velocity detected by the velocity sensor has exceeded a predetermined threshold value, while at the same time, the amount of bumper deformation calculated by the second calculation unit has exceeded a threshold value varying with the vehicle velocity.

Being thus arranged, the system can distinguish accurately between an obstacle of light weight and an object to be protected, since the amount of bumper deformation caused by the collision of the vehicle with any obstacle is small when the obstacle is an object of light weight, but is large if it is an object to be protected.

Desirably, the system further includes a memory storing a map containing the threshold value of the amount of bumper deformation varying with the vehicle velocity. The threshold value of the bumper deformation amount in the map so varies as to increase with an increase of the vehicle velocity, thereby enabling an accurate distinction of obstacles despite the amount of bumper deformation varying with the vehicle speed prevailing at the time of collision.

According to a third aspect of the present invention, there is provided a vehicle hood operating system comprising: a velocity sensor for detecting a velocity of a vehicle; an acceleration sensor for detecting acceleration caused by an external force directed from a front to a back of the vehicle to act upon a bumper; a first calculation unit for calculating a bumper deformation speed by converting the acceleration detected by the acceleration sensor to a speed; a second calculation unit for calculating an amount of bumper deformation from the bumper deformation speed calculated by the first calculation unit; an actuator for lifting a hood a predetermined amount; and a control unit for controlling the actuator such that the actuator lifts the hood when the vehicle velocity detected by the velocity sensor has exceeded a predetermined threshold value, while at the same time, the bumper deformation speed calculated by the first calculation unit has exceeded a threshold value varying with the vehicle velocity and the amount of bumper deformation calculated by the second calculation unit has exceeded a threshold value varying with the vehicle velocity.

The system thus-arranged ensures a still higher accuracy of obstacle distinction than the system according to the first or second aspect of this invention, as it relies upon both of the speed and amount of bumper deformation for obstacle distinction.

It is desirable that the system further includes a first memory storing a map containing the threshold value of the bumper deformation speed varying with the vehicle velocity, and a second memory storing a map containing the threshold value of the amount of bumper deformation varying with the vehicle velocity. The threshold value in the map of the first memory so varies as to increase with an increase of the vehicle speed. The threshold value in the map of the second memory also so varies as to increase with an increase of the vehicle speed.

According to a fourth aspect of this invention, there is provided a vehicle hood operating system comprising: a velocity sensor for detecting a velocity of a vehicle; a first acceleration sensor for detecting acceleration caused by an external force directed from a front to a back of the vehicle to act upon a bumper; a second acceleration sensor for detecting acceleration caused by an external force directed from a front to a back of the vehicle to act upon a vehicle body; a calculation unit for calculating deceleration acting upon the vehicle body from the acceleration detected by the second acceleration sensor; a timer designed to start counting time when the acceleration acting upon the bumper has reached a predetermined level; an actuator for lifting a hood a predetermined amount; and a control unit for controlling the actuator such that the actuator lifts the hood when the vehicle velocity detected by the velocity sensor has exceeded a predetermined threshold value, while at the same time, the deceleration of the vehicle body calculated by the calculation unit does not exceed a predetermined threshold value, but a predetermined period of time varying with the vehicle velocity has elapsed after the start of the timer.

The thus-arranged system can quickly distinguish between when the obstacle with which the vehicle has collided is a building, and when it is an object to be protected, since it relies upon the deceleration of the vehicle body for judgment as to the nature of the collision.

In a preferred form, the system further includes a memory storing a map containing the length of the predetermined period of time varying with the vehicle velocity. The predetermined period of time in the map so varies as to decrease with an increase of the vehicle velocity. Thus, the system makes proper judgment at any vehicle velocity and ensures an improved accuracy of distinction between a building and an object to be protected.

BRIEF DESCRIPTION OF THE DRAWINGS

Certain preferred embodiments of the present invention will now be described in detail, by way of example only, with reference to the accompanying drawings, in which:

FIGS. 4A to 4C are diagrams showing the waveforms of outputs produced by a bumper acceleration sensor, a unit for calculating the speed of bumper deformation and a smoothing unit, respectively, upon collision of the vehicle with an object of light weight;

FIGS. 5A to 5C are diagrams showing the waveforms of outputs produced by the bumper acceleration sensor, unit for calculating the speed of bumper deformation, and smoothing unit, respectively, upon collision of the vehicle with an object to be protected;

FIG. 17 illustrates the waveforms of outputs produced by the units shown in FIG. 15 for calculating the speed and amount of bumper deformation, respectively, upon collision of the vehicle with an object of light weight;

FIG. 18 illustrates the waveforms of outputs produced by the units shown in FIG. 15 for calculating the speed and amount of bumper deformation, respectively, upon collision of the vehicle with an object to be protected;

FIG. 20 is a graph showing the characteristics of a map stored in the memory shown in FIG. 19, and showing a length of time in relation to the vehicle velocity;

DETAILED DESCRIPTION OF THE PREFERRED EMBODIMENTS

The following description is merely exemplary in nature and is in no way intended to limit the invention, its application or uses.

Figure 1:
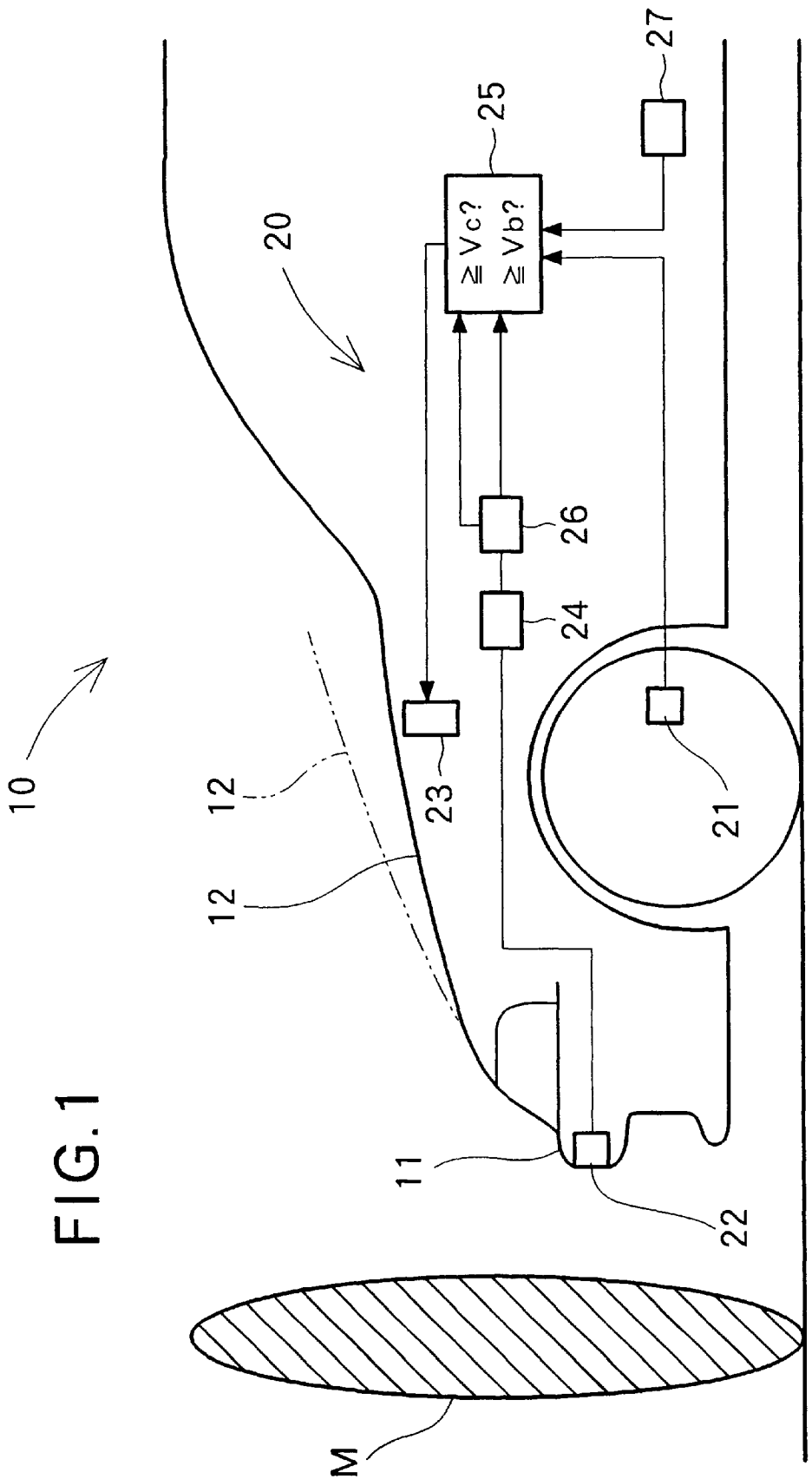
FIG. 1 is a diagram showing a part of a vehicle including a vehicle hood operating system according to a first embodiment of this invention.

Referring initially to FIG. 1, a vehicle hood operating system, generally designated by reference numeral 20, according to a first embodiment of the present invention is shown as mounted to a vehicle 10 and comprises a vehicle velocity sensor 21 for detecting the velocity V of the vehicle, an acceleration sensor 22, a calculation unit 24 for calculating the speed of bumper deformation, an actuator 23, a control unit 25, and a smoothing unit 26.

The acceleration sensor 22 detects acceleration caused by an external force traveling from the front of the vehicle 10 to its back to act upon a bumper 11. The acceleration sensor 22 outputs different waveforms of acceleration when the obstacle M with which the vehicle 10 has collided is an object to be protected, and when it is another object M, as shown in FIGS. 4A and 5A.

The unit 24 for calculating the speed of bumper deformation calculates it by converting an acceleration signal as detected by the acceleration sensor 22 to a speed signal. Its calculation is the integration by time of the acceleration as detected by the sensor 22. The interval of integration is so set as to be longer than the time considered to elapse before the speed of bumper deformation reaches the maximum after the collision of the vehicle 10 with the obstacle M. The time for integration may be, for example, about 30 to 40 ms.

The actuator 23 works to lift a hood 12 to an appropriate extent in accordance with a control signal from the control unit 25.

The control unit 25 controls the actuator 23 to cause it to lift the hood 12 only when the vehicle velocity as detected by the sensor 21 has exceeded a predetermined threshold value Vc, while at the same time, the speed of bumper deformation as calculated by the unit 24 has exceeded a threshold value Vb varying with the vehicle velocity V.

The smoothing unit 26 smoothes the speed of bumper deformation as calculated by the unit 24. The smoothing unit 26 takes an average value over a certain length of time in order to lower a high speed of bumper deformation occurring only briefly immediately after collision. The length of time employed for calculating the average value may be, for example, about 5 to 10 ms.

A memory is shown at 27, and stores a map showing the threshold value Vb for the speed of bumper deformation in relation to the vehicle velocity V. The control unit 25 accesses the memory 27 in accordance with vehicle velocity data, and reads the threshold value Vb corresponding to the vehicle velocity V. The memory 27 may be ROM or RAM.

According to this invention, it is possible to place the hood 12 quickly in its effective position, since an external force traveling from the front of the vehicle 10 to its back is detected by the acceleration sensor 22 and the hood 12 is lifted when the vehicle velocity is in a certain range, as described. Moreover, it is possible to realize an improved accuracy of distinction as to the obstacle M by employing the threshold values Vb and Vc for distinguishing between an object which is not an object to be protected, but is lighter and harder than it (hereinafter referred to simply as an object of light weight) and an object to be protected, in view of the facts that the speed of bumper deformation is low if the obstacle M is an object of light weight, while it is higher if it is an object to be protected, and that the speed of bumper deformation varies with the vehicle velocity.

Figure 2:
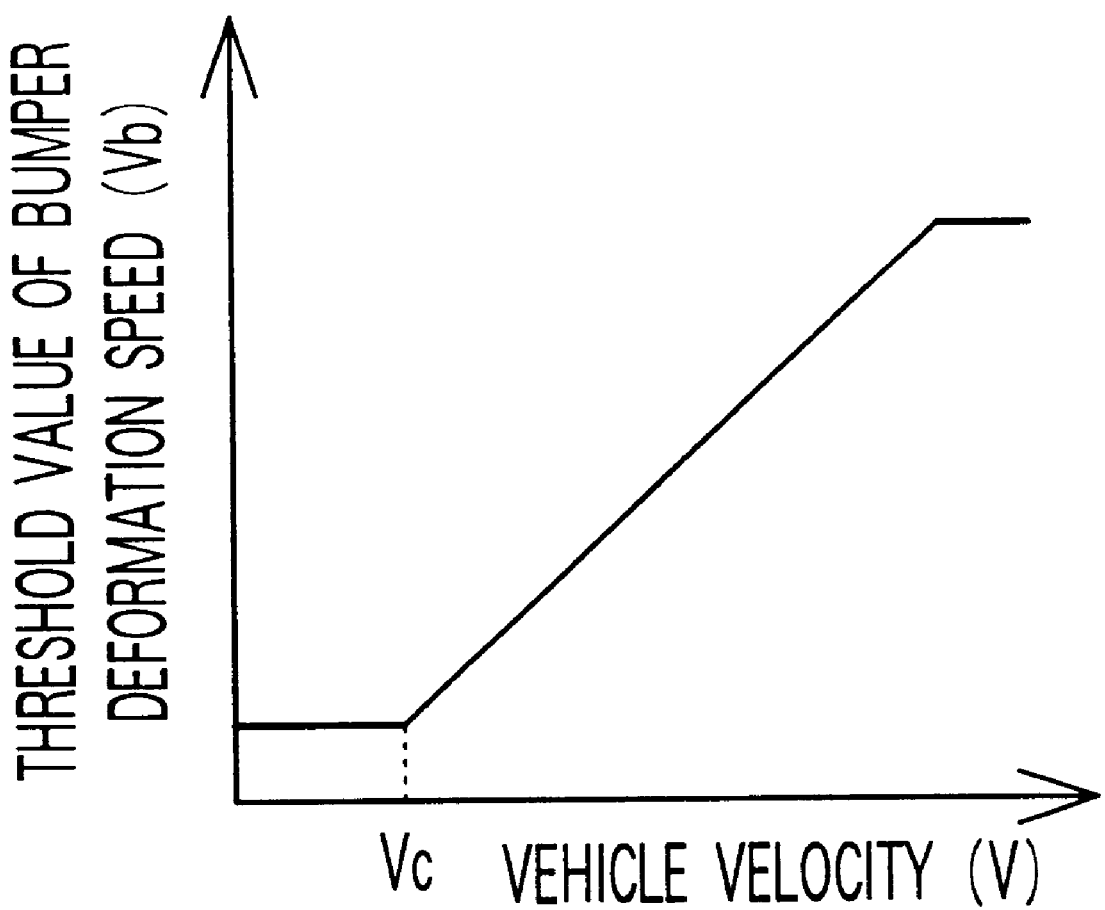
FIG. 2 is a graph showing the characteristics of a map stored in a memory as shown in FIG. 1, and showing the threshold value of a bumper deformation speed in relation to the vehicle velocity.

FIG. 2 is a graph showing the characteristics of the map stored in the memory 27 in the system according to the first embodiment of this invention, and showing the threshold value for the speed of bumper deformation in relation to the vehicle velocity.

The map shows the threshold value Vb varying with the vehicle velocity V. More specifically, it shows the threshold value Vb increasing with an increase of the vehicle velocity V in proportion thereto when the vehicle velocity V is within a certain range. Thus, it is possible to realize an improved accuracy of distinction as to an object to be protected when the vehicle has a low velocity, or as to an object of light weight when it has a high velocity.

Figure 3:
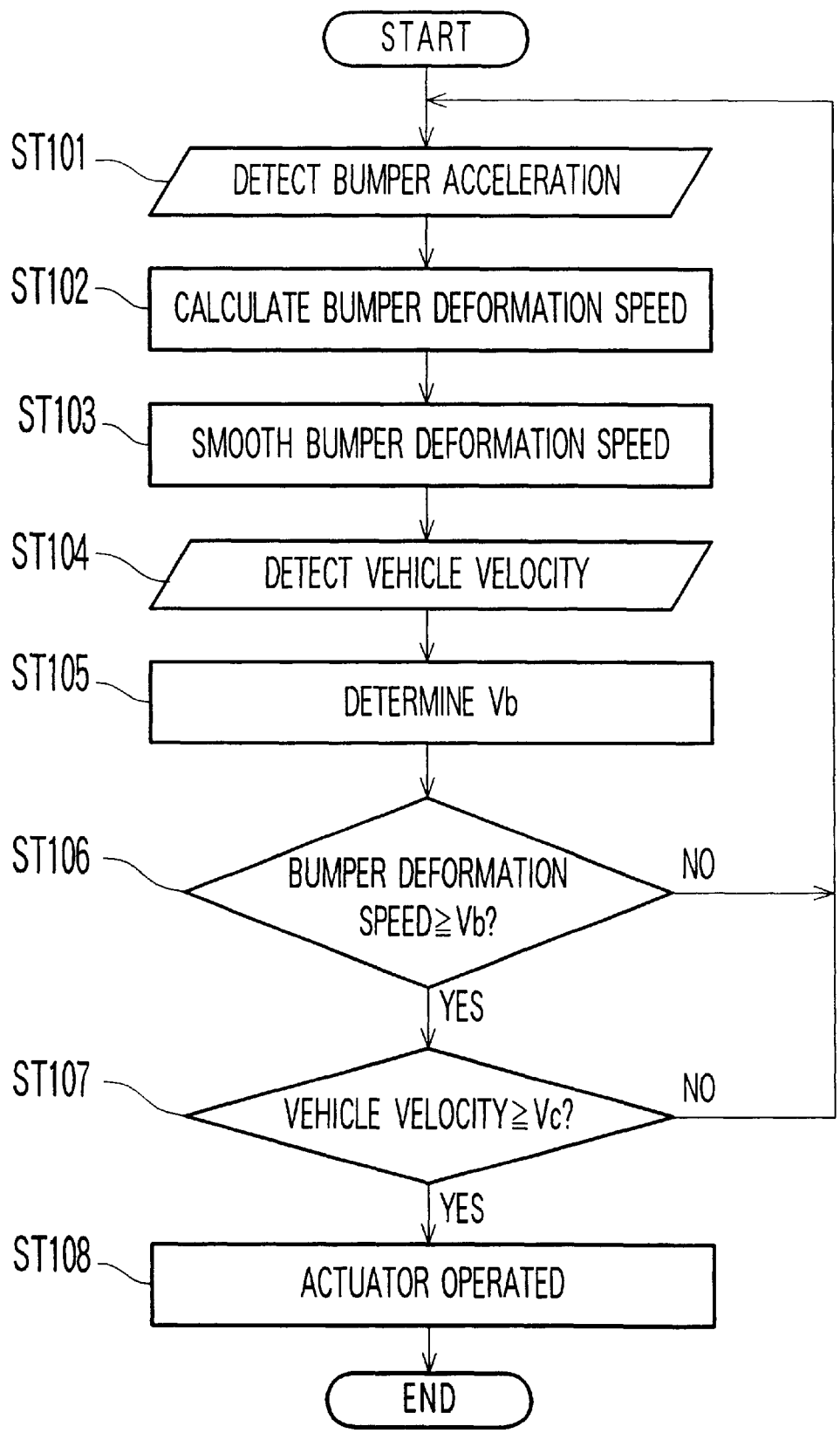
FIG. 3 is a flowchart showing the performance of the system shown in FIG. 1.

The performance of the system according to the first embodiment of this invention as shown in FIG. 1 will now be described with reference to the flowchart of FIG. 3.

Step (ST) 101: Referring to FIG. 1, the acceleration acting upon the bumper 11 is detected by its sensor 22 upon collision of the vehicle 10 with the obstacle M.

ST102: The speed of bumper deformation is calculated from the bumper acceleration by its calculating unit 24. The speed is obtained by integrating the acceleration by time.

ST103: Smoothing treatment is given to the speed of bumper deformation as calculated at ST102. Its smoothing is carried out by taking an average value for a certain length of time during each cycle of treatment. The length of time employed for calculating the average value may be, for example, about 5 to 10 ms, as already stated. The smoothing treatment is intended for lowering a high speed of bumper deformation occurring only briefly immediately after the collision of the vehicle with, for example, an obstacle having a hard surface.

ST104: The vehicle velocity V is detected by its sensor 21.

ST105: The threshold value Vb for the speed of bumper deformation which corresponds to the vehicle velocity V as detected at ST104 is determined from the map shown in FIG. 2.

ST106: The speed of bumper deformation as smoothed at ST103 is compared with the threshold value Vb. If the speed is lower than the threshold value Vb, it is concluded that the obstacle M is an object of light weight, and the system returns to ST101. If the speed is equal to, or higher than the threshold value Vb, it is concluded that the obstacle M is an object to be protected, and the system proceeds to ST107.

ST107: The vehicle velocity prevailing at the time of the conclusion by ST106 that the vehicle 10 has collided with an object to be protected is compared with a predetermined threshold value Vc. If the vehicle velocity V is lower than the threshold value Vc, the system returns to ST101, since the obstacle M, or the object to be protected which has struck against the bumper 11, is not very likely to strike against the hood 12. If the vehicle velocity V is equal to, or higher than the threshold value Vc, however, the object to be protected is very likely to strike against the hood 12, and the system, therefore, proceeds to ST108, so that the actuator 23 may lift the hood 12 and thereby reduce any impact of the object striking against the hood 12.

Reference is now made to FIGS. 4A to 4C showing the waveforms of outputs produced by the acceleration sensor 22, unit 24 for calculating the speed of bumper deformation, and smoothing unit 26 shown in FIG. 1, respectively, when the obstacle M is an object of light weight. FIG. 4A shows the waveform of the output produced by the acceleration sensor 22 when the vehicle 10 has collided with an object of light weight. The bumper has a high value of acceleration immediately after the collision, but it gradually converges with the passage of time after fluctuating. If the acceleration of the bumper is integrated by time in the unit 24 for calculating the speed of its deformation, there is obtained a waveform as shown in FIG. 4B. According to FIG. 4B, a speed of bumper deformation close to its threshold value Vb is produced immediately after the collision. The smoothing of the waveform gives a waveform indicating a speed of bumper deformation which is by far lower than its threshold value Vb, as shown in FIG. 4C, and the obstacle M is concluded as an object of light weight.

FIGS. 5A to 5C show the waveforms of outputs produced by the acceleration sensor 22, unit 24 for calculating the speed of bumper deformation, and smoothing unit 26 shown in FIG. 1, respectively, when the obstacle M is an object to be protected. FIG. 5A shows the waveform of the output produced by the sensor 22 when the vehicle 10 has collided with an object to be protected. An object to be protected, which is not a sufficiently hard obstacle, does not show any greatly changing acceleration immediately after the collision, as compared with what is shown in FIG. 4A as occurring to a hard object of light weight. If the waveform is likewise integrated, there is obtained a waveform as shown in FIG. 5B. The waveform has a part showing a speed of bumper deformation exceeding its threshold value Vb. The smoothing of the waveform gives a waveform still having a part along which the speed exceeds its threshold value Vb, as shown in FIG. 5C, and the obstacle M is concluded as an object to be protected.

Figure 6:
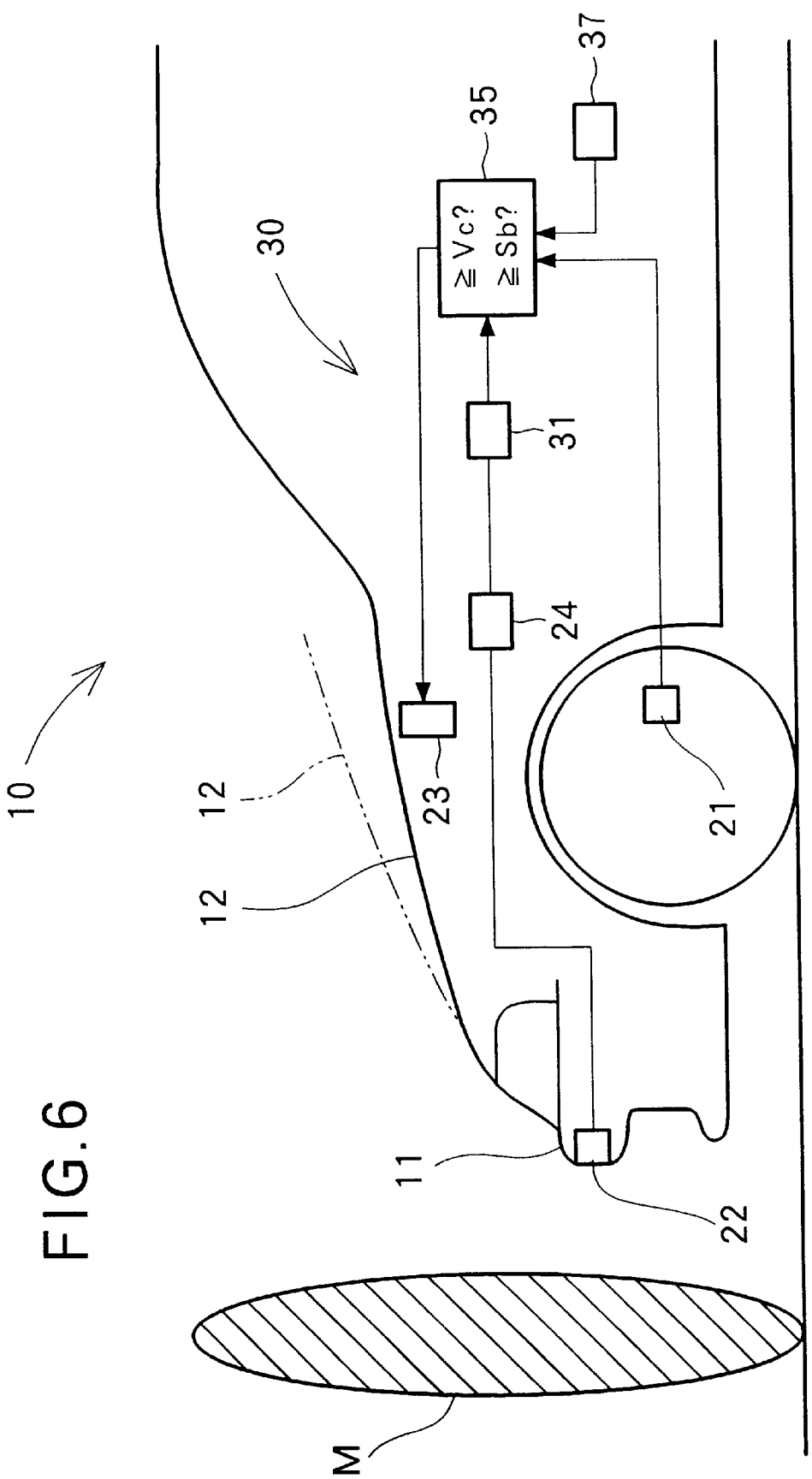
FIG. 6 is a diagram showing a part of a vehicle including a vehicle hood operating system according to a second embodiment of this invention.

FIG. 6 shows a vehicle including a vehicle hood operating system according to a second embodiment of this invention. Some of the reference numerals employed in FIG. 1 for the system according to the first embodiment of this invention are used to denote the same parts or members in FIG. 6, and no detailed description thereof will be repeated.

The system 30 has a vehicle velocity sensor 21, an acceleration sensor 22, a unit 24 for calculating the speed of bumper deformation, a unit 31 for calculating the amount of bumper deformation by converting the speed of bumper deformation as obtained from its calculating unit 24, an actuator 23 and a control unit 35.

The control unit 35 controls the actuator 23 to cause it to lift a hood 12 when the vehicle velocity as detected by its sensor 21 has exceeded a predetermined threshold value Vc, while at the same time, the amount of bumper deformation as calculated by its calculating unit 31 has exceeded a threshold value Sb varying with the vehicle velocity V.

A memory is shown at 37, and stores a map data showing the threshold value Sb for the amount of bumper deformation in relation to the vehicle velocity V. The control unit 35 accesses the memory 37 in accordance with vehicle velocity data, and reads the threshold value Sb corresponding to the vehicle velocity V. The memory 37 may be ROM or RAM.

The system distinguishes between two kinds of obstacles M, i.e. an object of light weight and an object to be protected, by employing the threshold values Sb and Vc in views of the facts that an object of light weight produces only a small amount of bumper deformation, while an object to be protected produces a larger amount thereof, and that its amount varies with the vehicle velocity.

Figure 7:
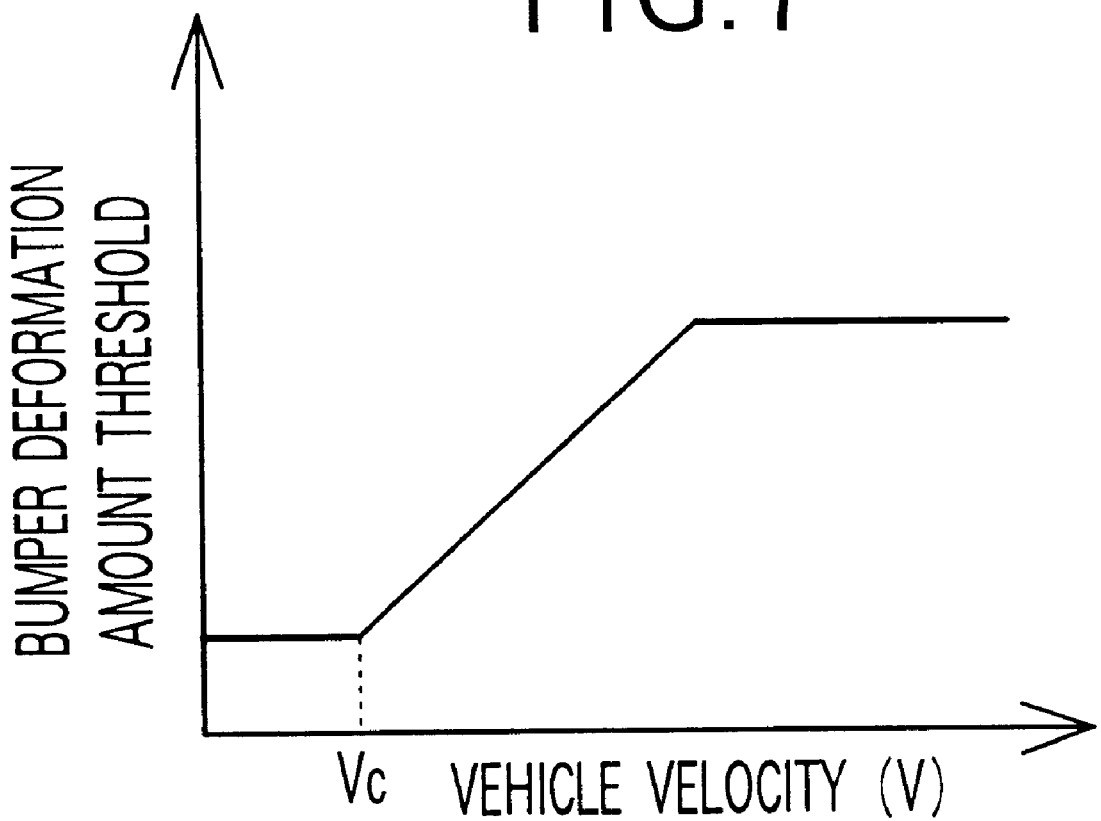
FIG. 7 is a graph showing the characteristics of a map stored in the memory shown in FIG. 6, and showing a threshold value for the amount of bumper deformation in relation to the vehicle velocity.

FIG. 7 is a graph showing the characteristics of the map stored in the memory 37. The map shows the threshold value Sb for the amount of bumper deformation which varies with the vehicle velocity V. More particularly, it shows the threshold value Sb varying in such a way as to increase with an increase of the vehicle velocity V in proportion thereto when the vehicle velocity V is within a certain range.

Figure 8:
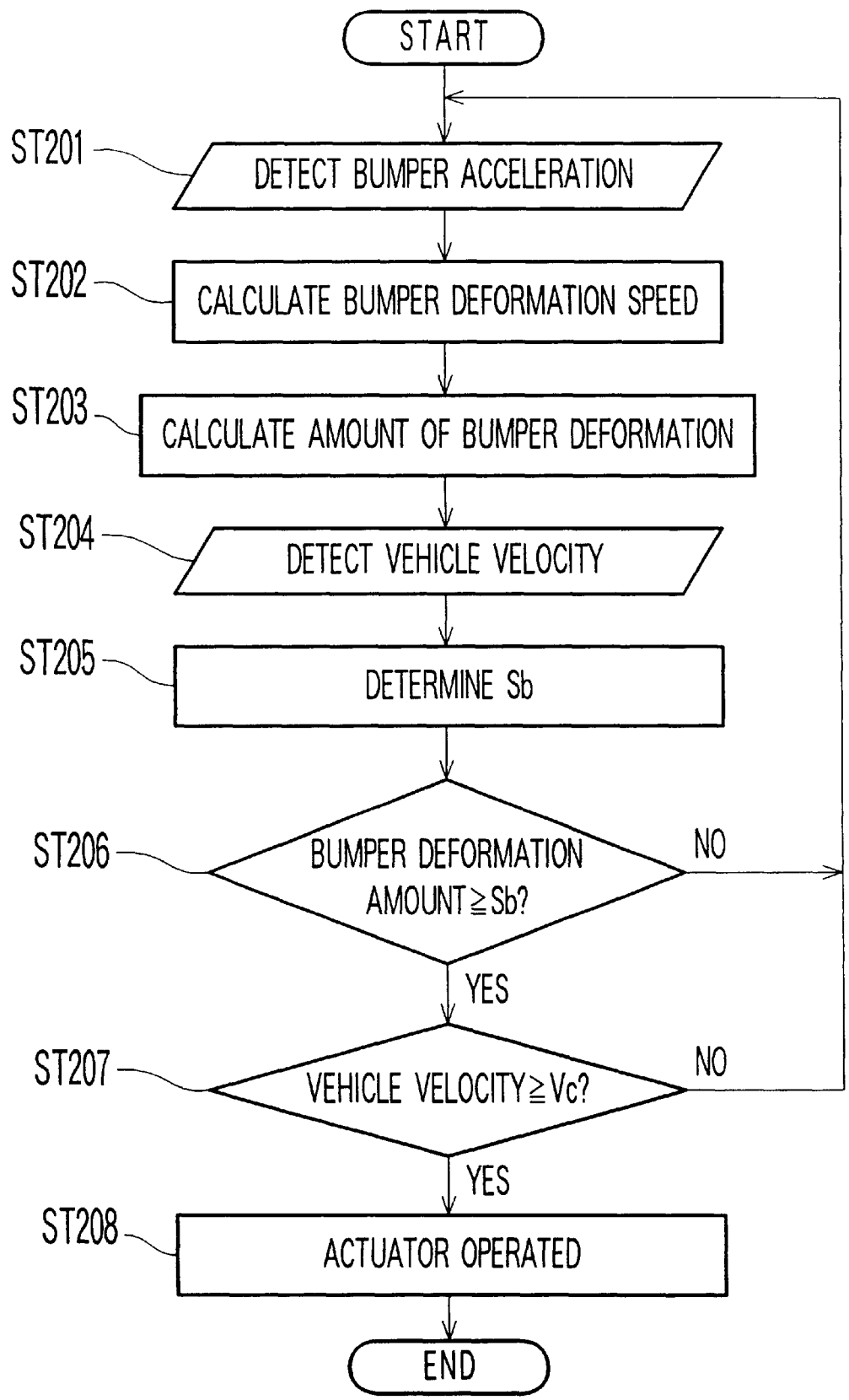
FIG. 8 is a flowchart showing the performance of the system according to the second embodiment.

The performance of the system according to the second embodiment shown in FIG. 6 will now be described with reference to the flowchart shown in FIG. 8 wherein ST is an abbreviation of STEP.

ST201: Referring to FIG. 6, the acceleration acting upon the bumper 11 is detected by its sensor 22 upon collision of the vehicle 10 with the obstacle M.

ST202: The speed of bumper deformation is calculated from the bumper acceleration by its calculating unit 24. The speed is obtained by integrating the acceleration by time.

ST203: The amount of bumper deformation is calculated by its calculating unit 31 from the speed as calculated at ST202. It is obtained by finding an integral of the speed of bumper deformation as calculated over a certain length of time after the collision of the bumper 11 with the obstacle M.

ST204: The vehicle velocity V is detected by its sensor 21.

ST205: The threshold value Sb for the amount of bumper deformation which corresponds to the vehicle velocity V as detected at ST204 is determined from the map shown in FIG. 7.

ST206: The amount of bumper deformation as calculated at ST203 is compared with the threshold value Sb, it is concluded that the obstacle M is an object of light weight, and the system returns to ST201. If the amount is equal to, or larger than the threshold value Sb, it is concluded that the obstacle M is an object to be protected, and the system proceeds to ST207.

ST207: The vehicle velocity V prevailing at the time of the conclusion by ST206 that the vehicle 10 has collided with an object to be protected is compared with a predetermined threshold value Vc. If the vehicle velocity V is lower than the threshold value Vc, the system returns to ST201, since the obstacle M, or the object to be protected which has struck against the bumper 11, is not very likely to strike against the hood 12. If the vehicle velocity V is equal to, or higher than the threshold value Vc, however, the object to be protected is very likely to strike against the hood 12, and the system, therefore, proceeds to ST208, so that the actuator 23 may lift the hood 12 and thereby reduce any impact of the object striking against the hood 12.

Figure 10:
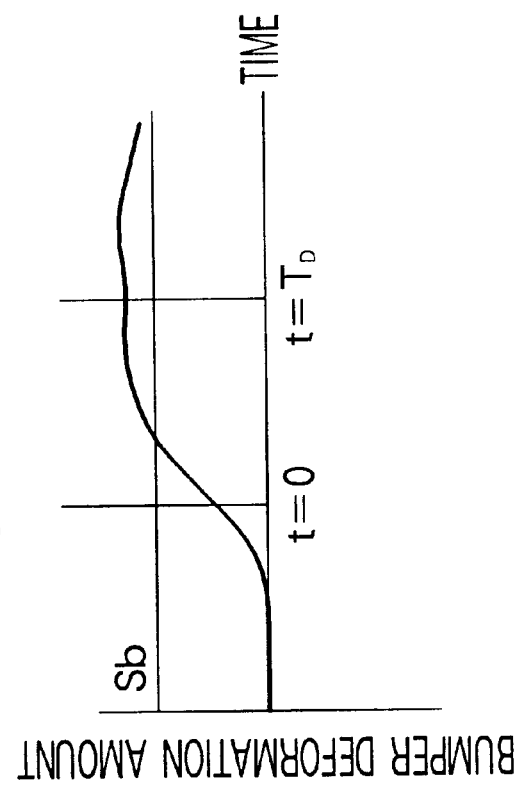
FIG. 10 is a diagram showing the waveform of an output produced by the unit shown in FIG. 6 for calculating the amount of bumper deformation, upon collision of the vehicle with an object to be protected.
Figure 9:
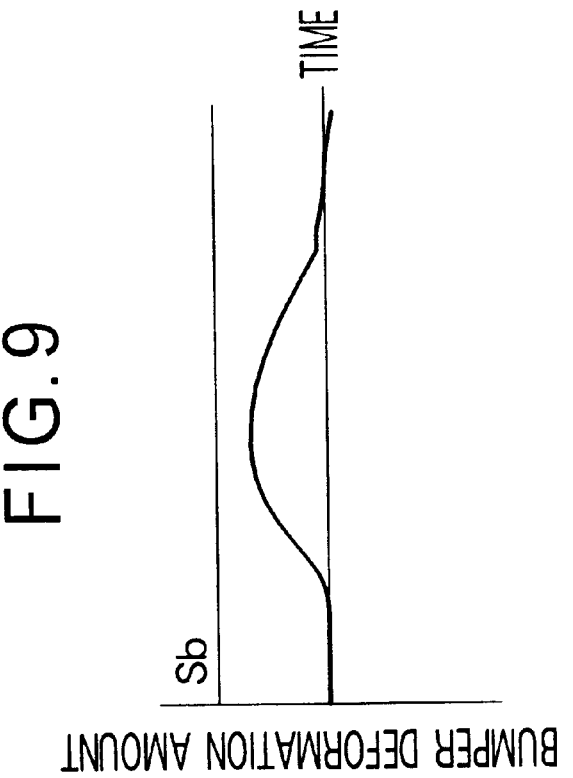
FIG. 9 is a diagram showing the waveform of an output produced by the unit shown in FIG. 6 for calculating the amount of bumper deformation, upon collision of the vehicle with an object of light weight.

FIGS. 9 and 10 show the waveforms of outputs produced by the unit 31 for calculating the amount of bumper deformation in the system shown in FIG. 6. FIG. 9 shows the waveform of the output produced when the obstacle M is an object of light weight. FIG. 10 shows the waveform of the output produced when the obstacle M is an object to be protected.

The amount shown in FIG. 9 can be calculated if the speed of bumper deformation as shown in FIG. 4B, which is obtained by integrating the bumper acceleration shown in FIG. 4A as already described, is integrated by its calculating unit 31. As the amount as calculated does not exceed the threshold value Sb, the obstacle M is concluded as an object of light weight.

The amount shown in FIG. 10 can likewise be calculated if the speed of bumper deformation as shown in FIG. 5B, which is obtained by integrating the bumper acceleration shown in FIG. 5A as already described, is integrated by its calculating unit 31. As the amount as calculated exceeds the threshold value Sb, the obstacle M is concluded as an object to be protected.

Figure 11:
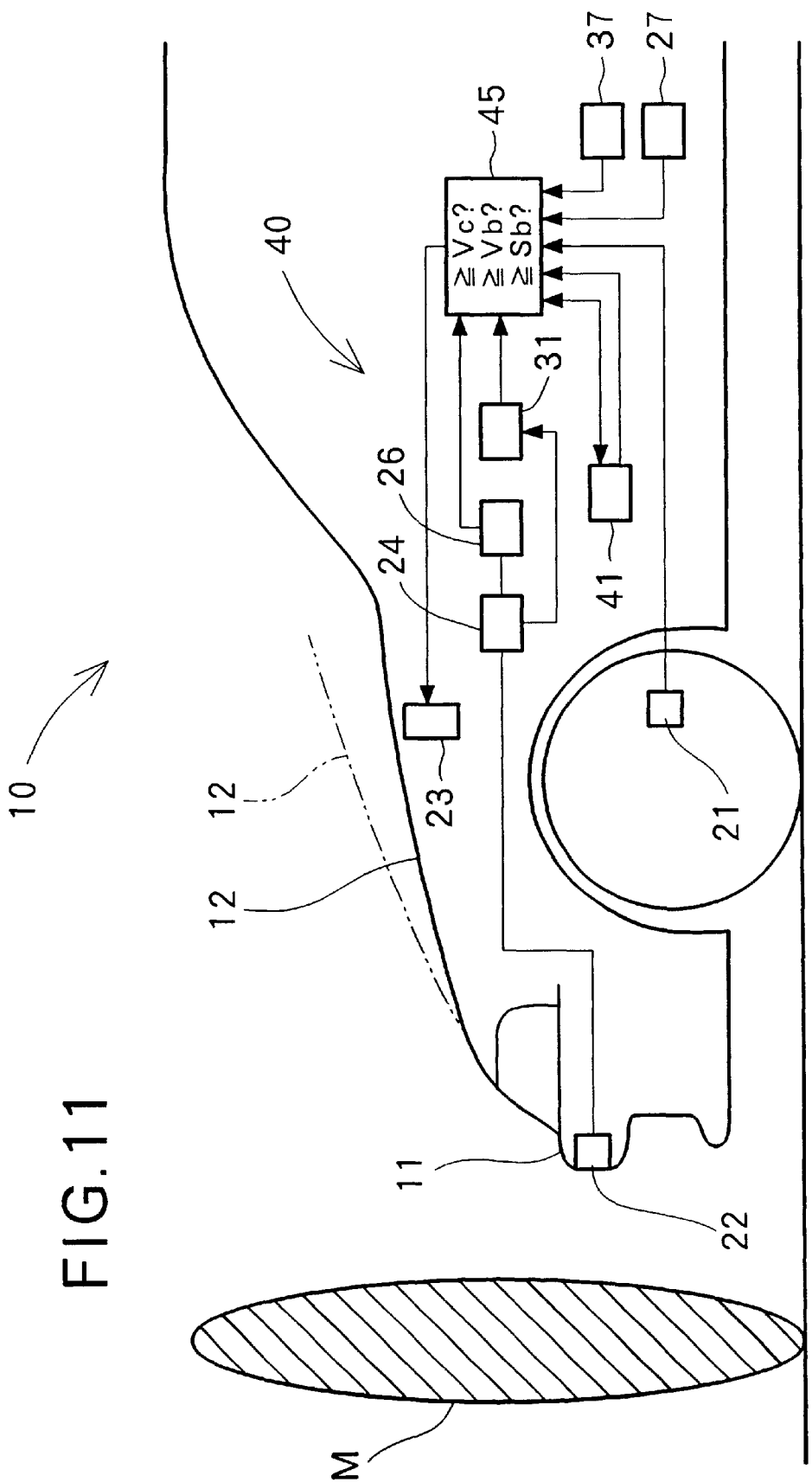
FIG. 11 is a diagram showing a part of a vehicle including a vehicle hood operating system according to a third embodiment of this invention.

FIG. 11 shows a vehicle including a vehicle hood operating system according to a third embodiment of this invention. Some of the reference numerals employed in FIGS. 1 and 6 for the systems according to the first and second embodiments, respectively, of this invention are used to denote the same parts or members in FIG. 11, and no detailed description thereof will be repeated.

The system 40 has a vehicle velocity sensor 21, an acceleration sensor 22, a unit 24 for calculating the speed of bumper deformation, a smoothing unit 26, a unit 31 for calculating the amount of bumper deformation, a timer 41 for counting a certain length of time after the speed of bumper deformation has exceeded its threshold value Vb varying with the vehicle velocity V, an actuator 23 and a control unit 45.

The control unit 45 controls the actuator 23 to cause it to lift a hood 12 when three conditions have been satisfied at the same time, i.e. when the vehicle velocity as detected by its sensor 21 has exceeded a predetermined threshold value Vc, while the speed of bumper deformation as calculated by its calculating unit 24 has exceeded the threshold value Vb varying with the vehicle velocity V and the amount of bumper deformation as calculated by its calculating unit 31 has exceeded a threshold value Sb varying with the vehicle velocity V.

A first and a second memory are shown at 27 and 37. The first memory 27 stores the map data shown in FIG. 2 and showing the threshold value Vb varying with the vehicle velocity V. The second memory 37 stores the map data shown in FIG. 7 and showing the threshold value Sb varying with the vehicle velocity V.

The system distinguishes between an object of light weight and an object to be protected by employing the threshold values Vb, Sb and Vc in view of the facts that if the obstacle M is an object of light weight, it gives the bumper only a low speed and a small amount of deformation, while an object to be protected gives it a higher speed and a larger amount of deformation, and that the speed and amount of bumper deformation vary with the vehicle velocity V.

Figure 12:
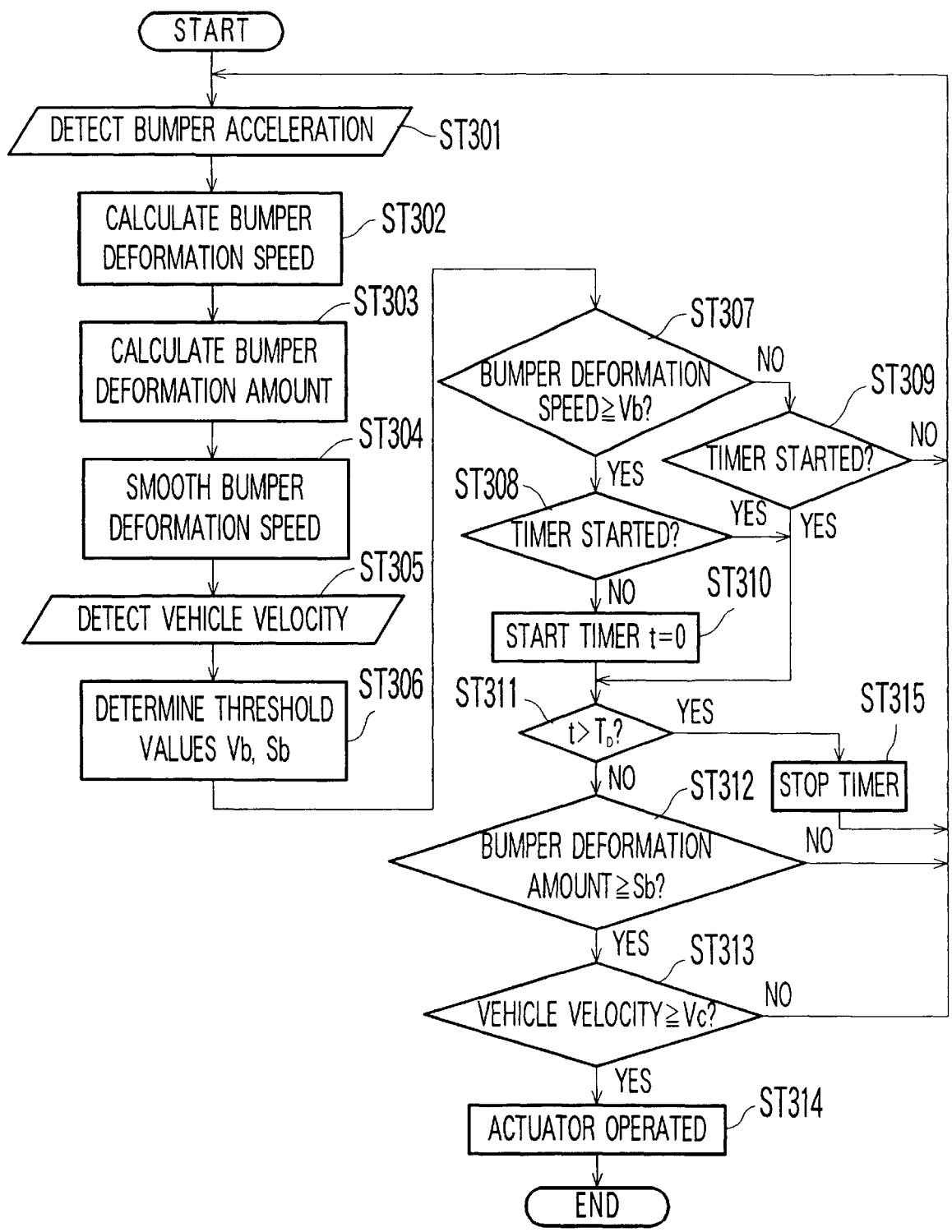
FIG. 12 is a flowchart showing the performance of the system shown in FIG. 11.

The performance of the system according to the third embodiment shown in FIG. 11 will now be described with reference to the flowchart shown in FIG. 12.

ST301: The collision of the vehicle 10 with the obstacle M produces acceleration acting upon the bumper 11. The acceleration is detected by its sensor 22.

ST302: The speed of bumper deformation is calculated from the acceleration acting upon the bumper by its calculating unit 24. It is calculated by integrating the acceleration acting upon the bumper 11 over a certain length of time after its collision with the obstacle M.

ST303: The amount of bumper deformation is calculated from the speed of bumper deformation by its calculating unit 31. It is calculated by integrating the speed of deformation occurring to the bumper 11 over a certain length of time after its collision with the obstacle M.

ST304: The speed of bumper deformation as calculated at ST302 is smoothed by its smoothing unit 26 by repeating the procedure of ST103 shown in FIG. 3.

ST305: The vehicle velocity V is detected by its sensor 21.

ST306: The threshold values Vb and Sb for the speed and amount, respectively, of bumper deformation are determined in accordance with the vehicle velocity V as detected at ST305. The threshold value Vb is determined from the map shown in FIG. 2, and the value Sb from the map shown in FIG. 7.

ST307: The speed of bumper deformation is compared with its threshold value Vb. If the speed is higher than the threshold value Vb, the system proceeds to ST308, and if not, to ST309.

ST308: If the timer 41 has started, the system proceeds to ST311, and if not, to ST310.

ST309: If the timer 41 has started, the system proceeds to ST311, and if not, it returns to ST301.

ST310: The timer 41 is started. The time which has elapsed is shown as t.

ST311: The time elapsed t is compared with a predetermined length of time $T_D$. If t exceeds $T_D$, the system proceeds to ST315, where the timer is stopped, and the system returns to ST301. If not, it proceeds to ST312.

ST312: The amount of bumper deformation is compared with its threshold value Sb. If the amount if equal to or smaller than the threshold value Sb, the obstacle M is concluded as an object of light weight, and the system returns to ST301, and if the amount is equal to, or larger than the threshold value Sb, the obstacle M is concluded as an object to be protected, and the system proceeds to ST313.

ST313: The vehicle velocity V as detected at ST305 is compared with the predetermined threshold value Vc. If the velocity V is lower than the threshold value Vc, the system returns to ST301, since the possibility of the object striking against the hood 12 is low. If the velocity V is equal to, or higher than the threshold value Vc, such possibility is high, and the system proceeds to ST314, so that the actuator 23 may lift the hood 12 and thereby reduce any impact of the object striking against the hood 12.

Figure 14:
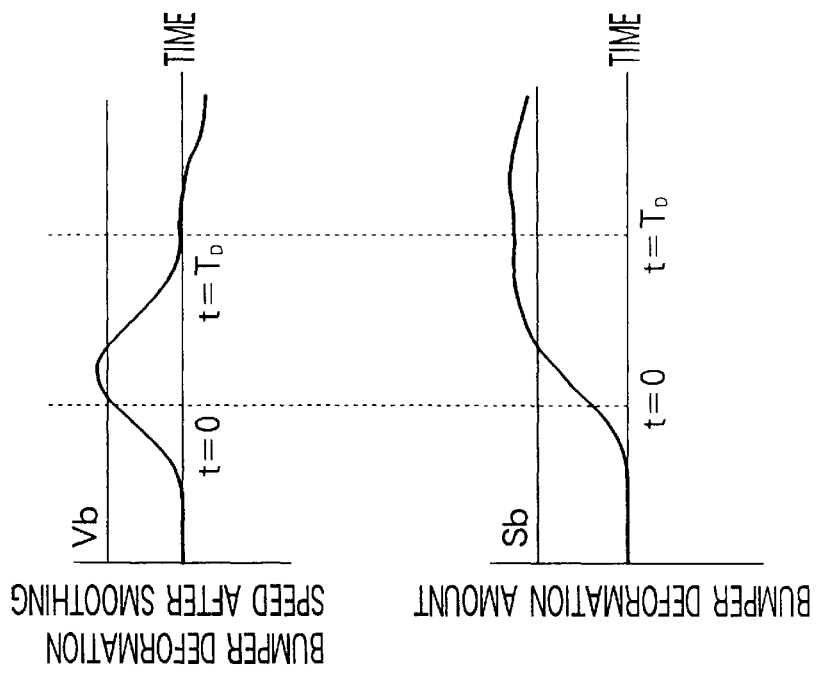
FIG. 14 illustrates the waveforms of outputs produced by the smoothing unit and unit for calculating the amount of bumper deformation, as shown in FIG. 11, upon collision of the vehicle with an object to be protected.
Figure 13:
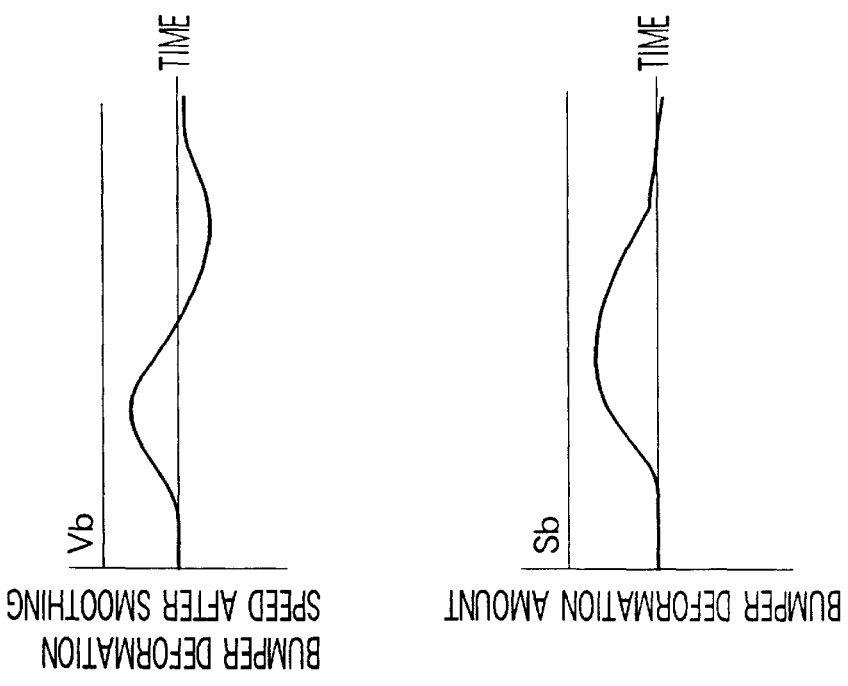
FIG. 13 illustrates the waveforms of outputs produced by the smoothing unit and unit for calculating the amount of bumper deformation, as shown in FIG. 11, upon collision of the vehicle with an object of light weight.

(a) and (b) of FIGS. 13 and 14 show the waveforms of outputs produced by the smoothing unit 26 and the unit 31 for calculating the amount of bumper deformation in the system 10 according to the third embodiment shown in FIG. 11. (a) of FIG. 13 corresponds to FIG. 4C as referred to for the description of the first embodiment of this invention, and shows the waveform of the output produced by the smoothing unit 26 when the obstacle M is an object of light weight. (b) of FIG. 13 corresponds to FIG. 9 as referred to for the description of the second embodiment of this invention, and shows the waveform of the output produced by the unit 31 for calculating the amount of bumper deformation when the obstacle M is an object of light weight.

If the obstacle M is an object of light weight, the speed of bumper deformation has the waveform as shown in (a) of FIG. 13 after smoothing, and the amount thereof has the waveform as shown in (b) of FIG. 13. If the speed or amount of bumper deformation is smaller than the threshold value Vb or Sb, the obstacle M is concluded as an object of light weight.

If the obstacle is an object to be protected, the timer 41 starts when the speed of bumper deformation as obtained after smoothing has exceeded its threshold value Vb, as shown in (a) of FIG. 14. The amount of bumper deformation exceeds its threshold value Sb before the time t which has thereafter elapsed exceeds the predetermined length of time TD, as shown in (b) of FIG. 14, and the obstacle is concluded as an object to be protected.

Although the threshold values Vb and Sb for the speed and amount, respectively, of bumper deformation have both been described as varying with the vehicle velocity V, it is alternatively satisfactory for only one of them to vary with the vehicle velocity.

Figure 15:
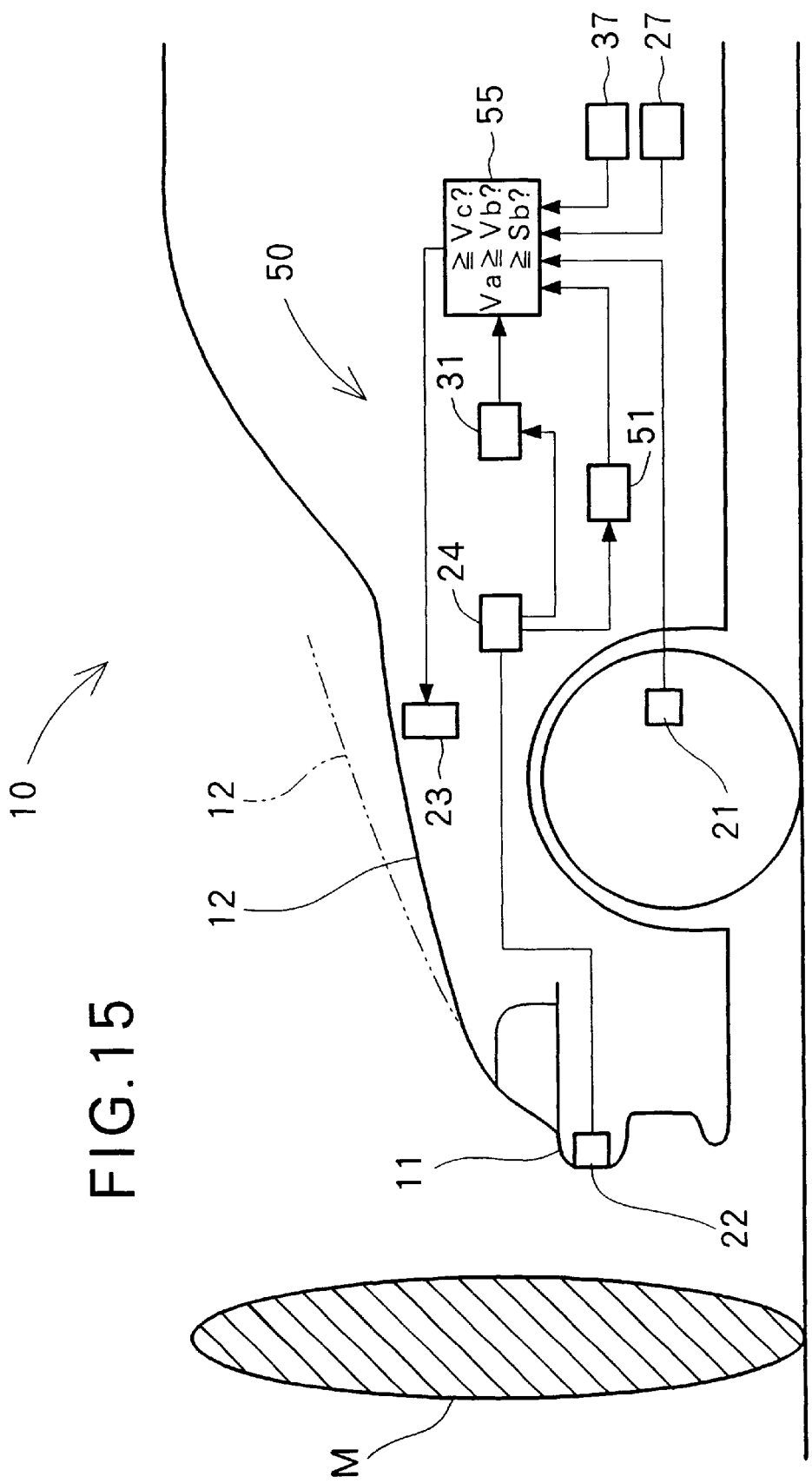
FIG. 15 is a diagram showing a part of a vehicle including a vehicle hood operating system according to a fourth embodiment of this invention.

FIG. 15 shows a vehicle 10 including a vehicle hood operating system according to a fourth embodiment of this invention. Some of the reference numerals employed in FIGS. 1 and 6 for the systems according to the first and second embodiments, respectively, of this invention are used to denote the same parts or members in FIG. 15, and no detailed description thereof will be repeated.

The system 50 according to the fourth embodiment has a vehicle velocity sensor 21, an acceleration sensor 22, a unit 24 for calculating the speed of bumper deformation, a unit 31 for calculating the amount of bumper deformation, a storage unit 51 for storing the speed of bumper deformation as calculated by its calculating unit 24, an actuator 23 and a control unit 55.

The control unit 55 controls the actuator 23 to cause it to lift a hood 12 when three conditions have been satisfied at the same time, i.e. when the vehicle velocity as detected by its sensor 21 has exceeded a predetermined threshold value Vc, while the amount of bumper deformation as calculated by its calculating unit 31 has exceeded a threshold value Sb varying with the vehicle velocity V and the speed of bumper deformation as stored in the storage unit 51 has exceeded a predetermined threshold value Vb.

A first and a second memory are shown at 27 and 37, respectively. The first memory 27 stores the map data shown in FIG. 2, and showing the threshold value Vb in relation to the vehicle velocity V. The second memory 37 stores the map data shown in FIG. 7, and showing the threshold value Sb in relation to the vehicle velocity V.

The system distinguishes between an object of light weight and an object to be protected by employing the threshold values Vb, Sb and Vc in view of the facts that if the obstacle M is an object of light weight, it gives the bumper only a low speed and a small amount of deformation, while an object to be protected gives it a higher speed and a larger amount of deformation, and that the speed and amount of bumper deformation vary with the vehicle velocity V.

Figure 16:
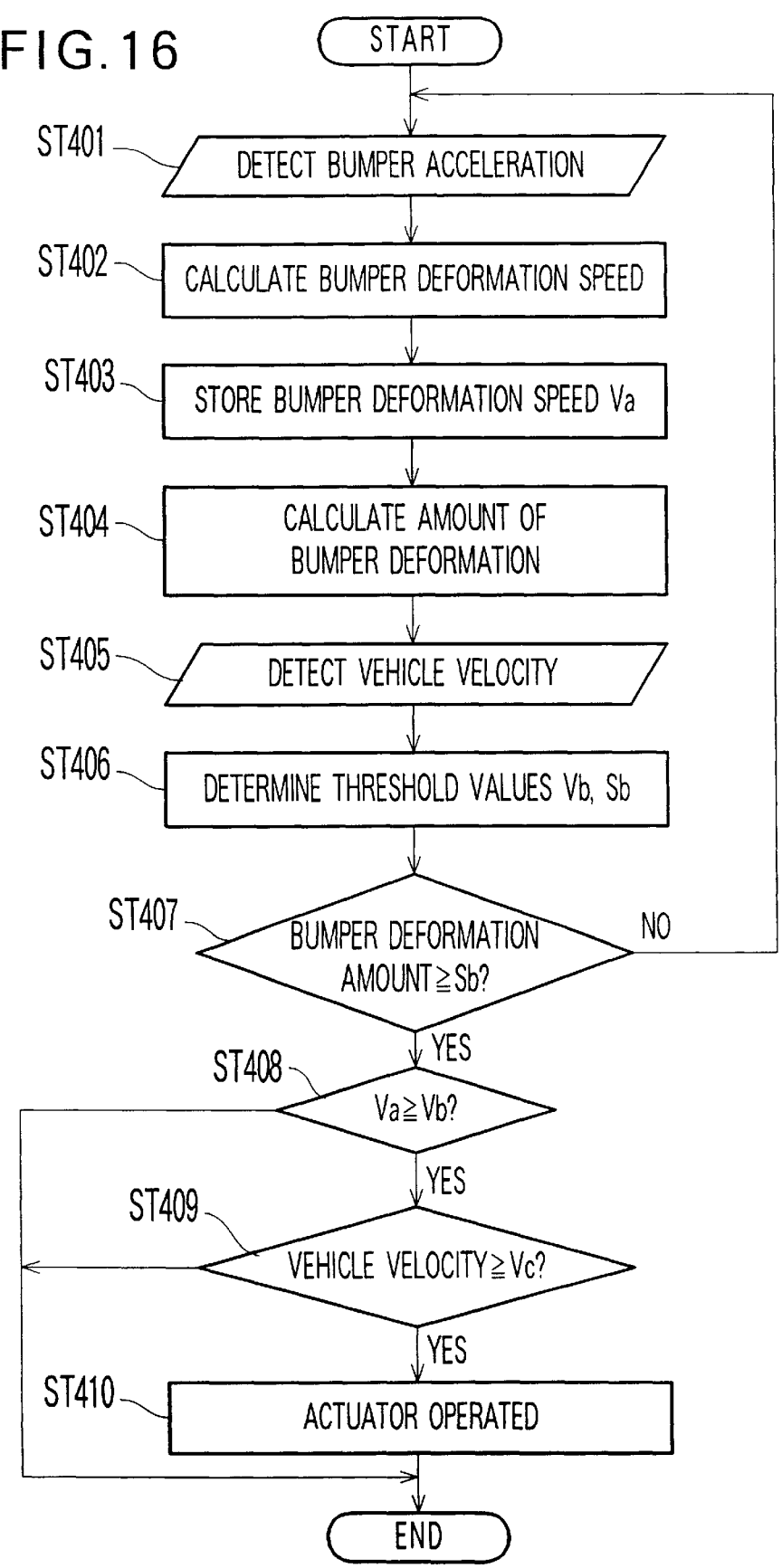
FIG. 16 is a flowchart showing the performance of the system shown in FIG. 15.

The performance of the system according to the fourth embodiment shown in FIG. 15 will now be described with reference to the flowchart in FIG. 16.

ST401: The collision of the vehicle 10 with the obstacle M produces acceleration acting upon the bumper 11. The acceleration is detected by its sensor 22.

ST402: The speed of bumper deformation is calculated from the acceleration acting upon the bumper by its calculating unit 24. It is calculated by integrating the acceleration acting upon the bumper 11 over a certain length of time after its collision with the obstacle M.

ST403: The speed Va of bumper deformation as calculated as ST402 is stored in the storage unit 51. It is a variable.

ST404: The amount of bumper deformation is calculated from the speed of bumper deformation by its calculating unit 31. It is calculated by integrating the speed of deformation occurring to the bumper 11 over a certain length of time after its collision with the obstacle M.

ST405: The vehicle velocity V is detected by its sensor 21.

ST406: The threshold values Vb and Sb for the speed and amount, respectively, of bumper deformation are determined from the vehicle velocity V as detected at ST405. The value Vb is determined from the map shown in FIG. 2, and the value Sb from the map shown in FIG. 7.

ST407: The amount of bumper deformation as calculated at ST404 is compared with its threshold value Sb. If the amount is smaller than the value Sb, the system returns to ST401 and repeats the renewal of the speed Va of bumper deformation. If the amount is equal to, or larger than the value Sb, the system proceeds to ST408. Therefore, the speed Va of bumper deformation at or after ST408 is that which is stored in the storage unit 51 when the amount of bumper deformation has become equal to, or larger than the threshold value Sb.

ST408: If the amount of bumper deformation has exceeded its threshold value Sb, judgment is made as to whether the speed Va of bumper deformation as stored in the storage unit 51 has exceeded its threshold value Vb, or not. If the speed Va is equal to, or higher than its threshold value Vb, the obstacle M is concluded as an object to be protected, and the system proceeds to ST409, but if the speed Va is lower than its threshold value Vb, the system finishes its control.

ST409: If it is concluded that the vehicle has collided with an object to be protected, the vehicle velocity V is compared with its predetermined threshold value Vc. If the velocity V is lower than its threshold value Vc, the system finishes its control without having the actuator 23 work. If the velocity V is equal to, or higher than its threshold value Vc, the system proceeds to ST410, and has the actuator 23 work to lift the hood 12 and thereby reduce any impact of the object to be protected striking against it.

Description will now be made with reference to (a) and (b) of FIGS. 17 and 18 about the conclusion by the system according to the fourth embodiment of this invention as to whether the obstacle is an object of light weight, or an object to be protected. Its conclusion as to whether the obstacle M is an object of light weight, or an object to be protected, is based on its comparison of the speed Va of bumper deformation at the point of time Ta at which the amount of bumper deformation has become equal to its threshold value Sb, with the corresponding threshold value Vb for the speed of bumper deformation.

(a) of FIG. 17 corresponds to FIG. 4B as referred to in the description of the system according to the first embodiment of this invention, and shows the waveform of the output produced by the unit 24 for calculating the speed of bumper deformation when the obstacle M is an object of light weight. FIG. 17(b) corresponds to FIG. 9 as referred to in the description of the system according to the second embodiment, and shows the waveform of the output produced by the unit 31 for calculating the amount of bumper deformation when the obstacle M is an object of light weight.

If the obstacle is an object of light weight, the speed Va of bumper deformation is lower than its threshold value Vb, as shown in (a) of FIG. 17, at the point of time Ta at which the amount of bumper deformation has become equal to its threshold value Sb, as shown in (b) of FIG. 17. Thus, the obstacle M is concluded as an object of light weight if the speed Va of bumper deformation does not exceed its threshold value Vb, though the amount of bumper deformation exceeds its threshold value Sb.

(a) of FIG. 18 corresponds to FIG. 4B as referred to in the description of the system according to the first embodiment of this invention, and shows the waveform of the output produced by the unit 24 for calculating the speed of bumper deformation when the obstacle M is an object to be protected. FIG. 18(b) corresponds to FIG. 9 as referred to in the description of the system according to the second embodiment of this invention, and shows the waveform of the output produced by the unit 31 for calculating the amount of bumper deformation when the obstacle M is an object to be protected.

If the obstacle is an object to be protected, the speed Va of bumper deformation is higher than its threshold value Vb, as shown in (a) of FIG. 18, at the point of time Ta at which the amount of bumper deformation has exceeded its threshold value Sb, as shown in (b) of FIG. 18. Thus, the obstacle M is concluded as an object to be protected if the amount of bumper deformation exceeds its threshold value Sb, and if the speed Va of bumper deformation also exceeds its threshold value Vb.

Figure 19:
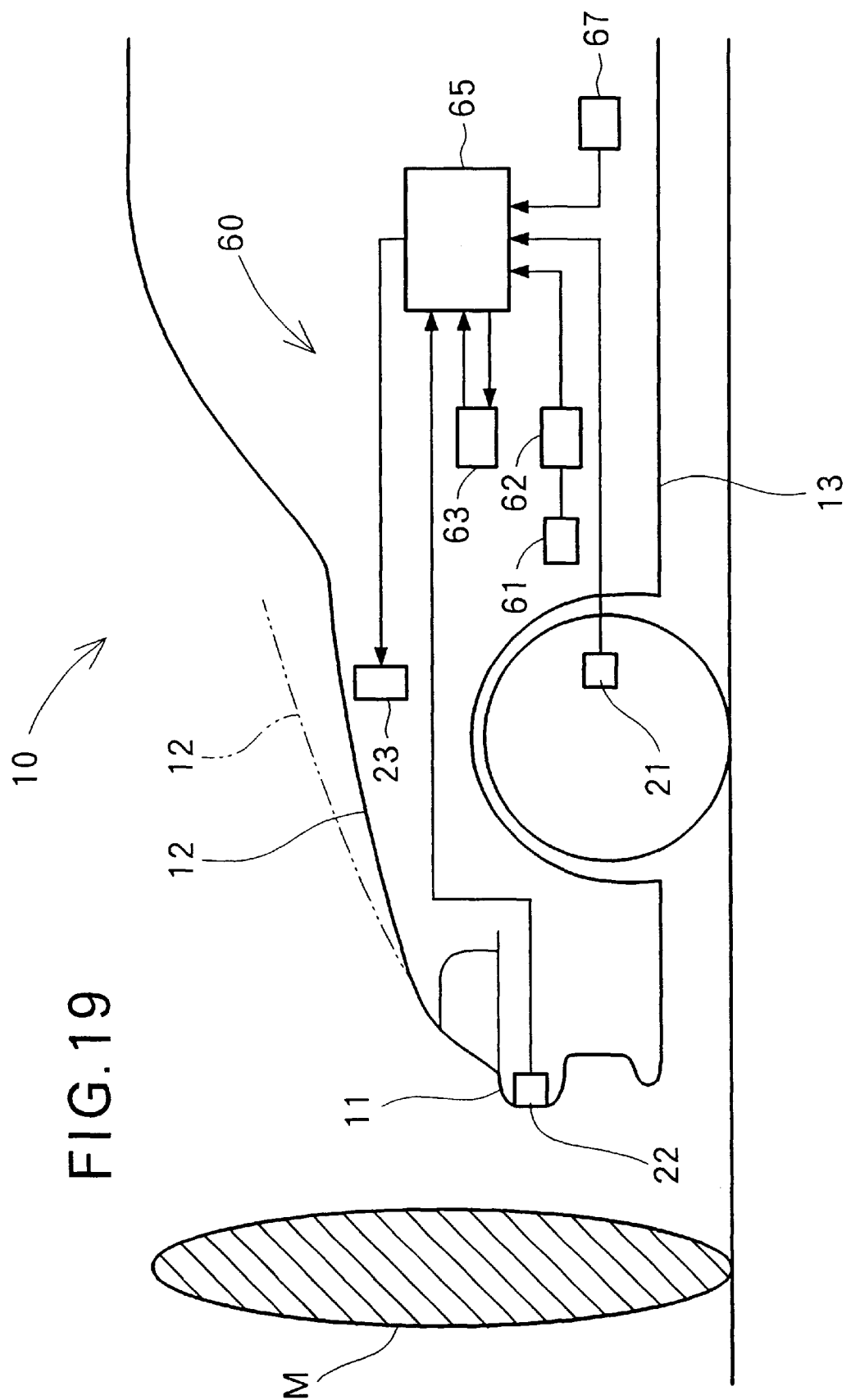
FIG. 19 is a diagram showing a part of a vehicle including a vehicle hood operating system according to a fifth embodiment of this invention.

FIG. 19 shows a vehicle 10 including a vehicle hood operating system according to a fifth embodiment of this invention. Some of the reference numerals employed in FIG. 1 for the system according to the first embodiment of this invention are used to denote the same parts or members in FIG. 19, and no detailed description thereof is repeated.

The system 60 has a vehicle velocity sensor 21, a bumper acceleration sensor 22, a vehicle body acceleration sensor 61 for detecting an acceleration caused by an external force traveling from the front of the vehicle 10 to its back to act upon a vehicle body 13, a unit 62 for calculating the deceleration of the vehicle body by converting the vehicle body acceleration as detected by its sensor 61, a timer 63 adapted to start counting time upon detection of a predetermined level of acceleration acting upon a bumper 11, an actuator 23 and a control unit 65.

The control unit 65 controls the actuator 23 so that it may lift a hood 12 when three conditions have all been satisfied, i.e. when the vehicle velocity as detected by its sensor 21 has exceeded a predetermined threshold value Vc, while the vehicle body deceleration Vf as calculated by its calculating unit 62 has not exceeded a predetermined threshold value Vt, but a predetermined length of time has elapsed after the starting of the timer 63.

A memory is shown at 67, and stores a map showing a predetermined length of time Tw in relation to the vehicle velocity V, as shown in FIG. 20. According to the map, the time Tw is so set as to vary with the vehicle velocity V exceeding its threshold value Vc when the vehicle 10 has collided with an obstacle M. More particularly, it is so set as to become shorter with an increase of the vehicle velocity V from its threshold value Vc. The predetermined length of time Tw is counted from the point of time Ts at which the vehicle 10 has collided with the obstacle M, and it varies with the vehicle velocity V, as stated above. The time Tw is very short as compared with the time which may elapse before an object to be protected strikes against the hood 12 after it has been hit by the vehicle 10. Therefore, it is possible to distinguish quickly between when the obstacle M is a building, and when it is an object to be protected.

Figure 22:
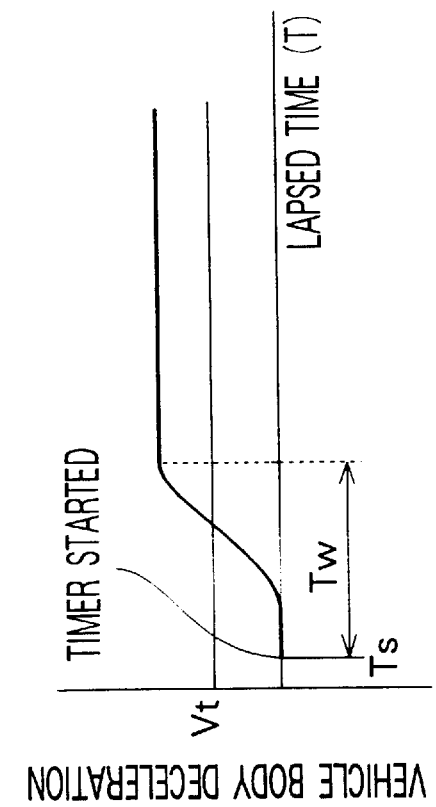
FIG. 22 is a diagram showing the waveform of an output produced by the deceleration calculating unit shown in FIG. 19 upon collision of the vehicle with an object to be protected.
Figure 21:
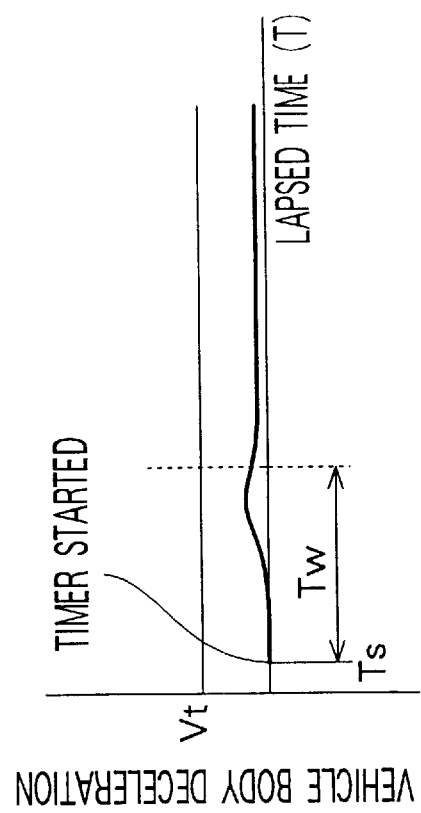
FIG. 21 is a diagram showing the waveform of an output produced by the deceleration calculating unit shown in FIG. 19 upon collision of the vehicle with a building.

FIG. 21 shows the waveform of an output produced by the deceleration calculating unit 62 shown in FIG. 19 upon collision of the vehicle 10 with a building. FIG. 22 shows the waveform of an output thereby produced upon collision of the vehicle 10 with an object to be protected.

If the collision of the vehicle with the obstacle M has been detected by the bumper acceleration sensor 22 when the vehicle velocity V is equal to, or higher than its threshold value Vc, the output of the vehicle body acceleration sensor 61 is used by the deceleration calculating unit 62 for calculating the deceleration Vf on the vehicle body at and after the point of time Ts when the collision has been detected. If the deceleration Vf on the vehicle body as calculated has not exceeded its threshold value Vt before the time Tw elapses, the obstacle M is concluded as an object to be protected, and the actuator 23 is caused to function.

If the vehicle 10 collides with an object to be protected when running at a high velocity, it is necessary to cause the actuator 23 to function earlier, since the object strikes against the hood 12 within a shorter time, but if the vehicle collides with a building when running at a high velocity, the time Tw can be by far shorter than the time which may elapse before the object to be protected strikes against the hood 12, since the deceleration Vf on the vehicle body exceeds its threshold value Vt earlier.

The system can make judgment instantly as to whether the hood 12 should be lifted, or not, since the control of the actuator 23 for lifting the hood 12 is carried out after the detection of the vehicle velocity V by its sensor 21, the detection of the acceleration acting upon the bumper by its sensor 22, the detection of the acceleration acting upon the vehicle body by its sensor 61 and the conversion thereof to the deceleration on the vehicle body by its calculating unit 62, as described. As a result, the actuator 23 is controlled to work quickly enough to protect an obstacle M if it is an object to be protected.

The performance of the system according to the fifth embodiment shown in FIG. 19 will now be described with reference to the flowchart shown in FIG. 23.

ST501: The collision of the bumper 11 with an obstacle M produces acceleration acting upon the bumper 11. The acceleration is detected by its sensor 22.

ST502: If the sensor 22 detects a predetermined level of acceleration on the bumper, the control unit 65 concludes that collision has occurred, and the system proceeds to ST503. If it concludes that no collision has occurred, the system returns to ST501 and keeps watch on the vehicle 10 for any collision.

ST503: The vehicle velocity V is detected by its sensor 21.

ST504: The vehicle velocity V as detected is compared with a predetermined threshold value Vc. If it is lower than the value Vc, the system returns to ST501, and if not, the system proceeds to ST505. The threshold value Vc defines the vehicle velocity below which the obstacle M which has struck against the bumper 11 is unlikely to strike against the hood 12.

ST505: The length of time Tw corresponding to the vehicle velocity as detected is determined from their map shown in FIG. 20.

ST506: The timer 63 is started to count time T which elapses.

ST507: The acceleration acting upon the vehicle body is detected by its sensor 61.

ST508: The deceleration Vf acting upon the vehicle body is calculated from the acceleration acting upon the vehicle body by its calculating unit 62. The integration of the acceleration by time gives the deceleration. In other words, an integral of acceleration acting upon the vehicle body over a certain length of time is calculated to obtain the deceleration Vf acting upon it.

ST509: The deceleration Vf is compared with a predetermined threshold value Vt. If the deceleration Vf is equal to, or higher than its threshold value Vt as shown in FIG. 21, the system concludes the obstacle M as a building, and returns to ST501 via ST512. If the deceleration Vf is lower than its threshold value Vt as shown in FIG. 22, the system concludes the obstacle M as an object to be protected, and proceeds to ST510.

ST510: The time T which has elapsed after the starting of the timer is compared with the time Tw varying with the vehicle velocity V. If the time T is shorter than the time Tw, the system returns to ST507, so that the calculation of the deceleration Vf on the vehicle body may be continued until the time Tw elapses. If the time T has become equal to the time Tw before the deceleration Vf reaches its threshold value Vt, the system proceeds to ST511.

ST511: The actuator 23 is caused to lift the hood 12.

ST512: The timer 63 and the unit 62 for calculating the deceleration are reset.

Figure 23:
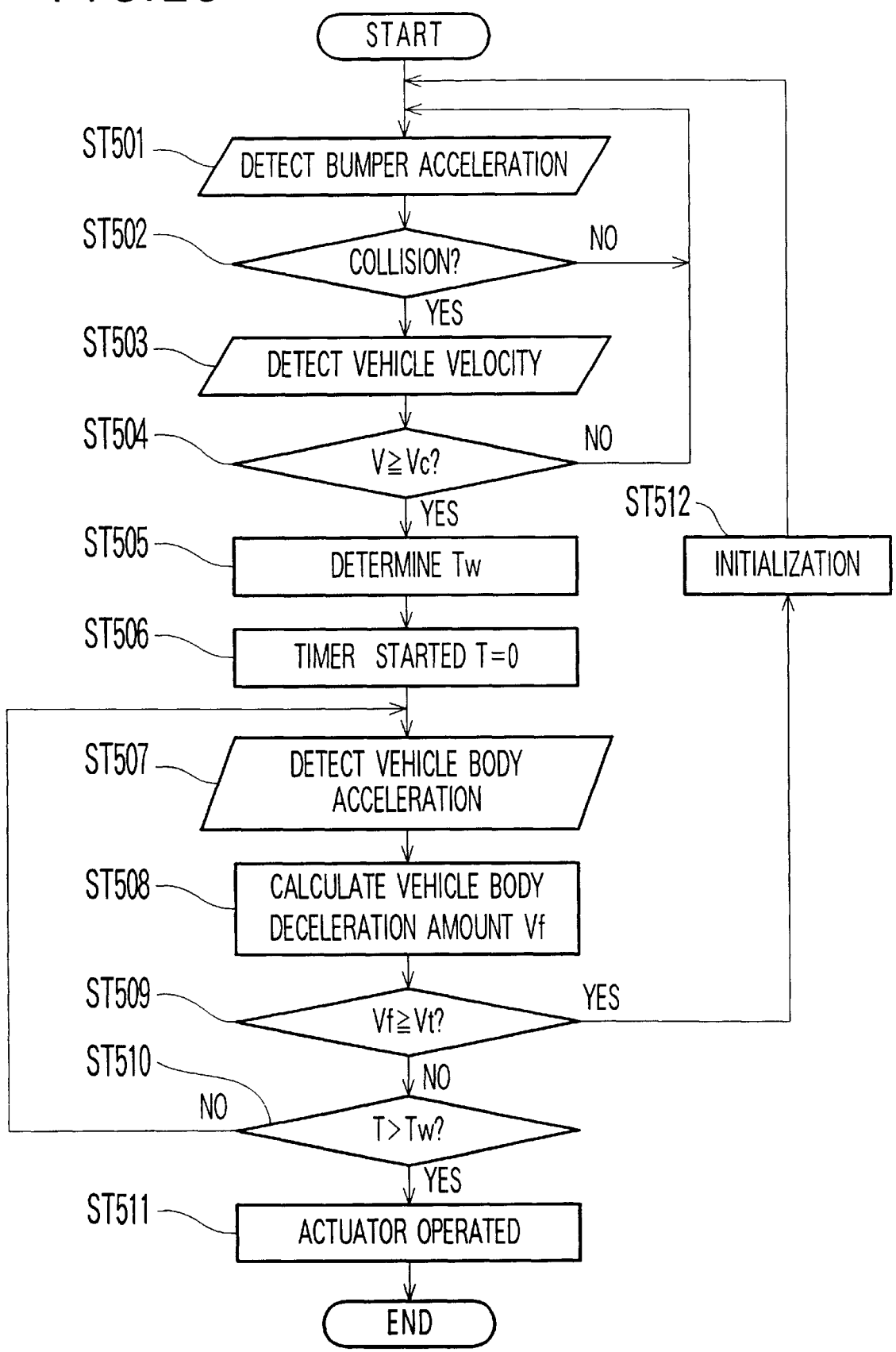
FIG. 23 is a flowchart showing the performance of the system shown in FIG. 19.
Figure 24:
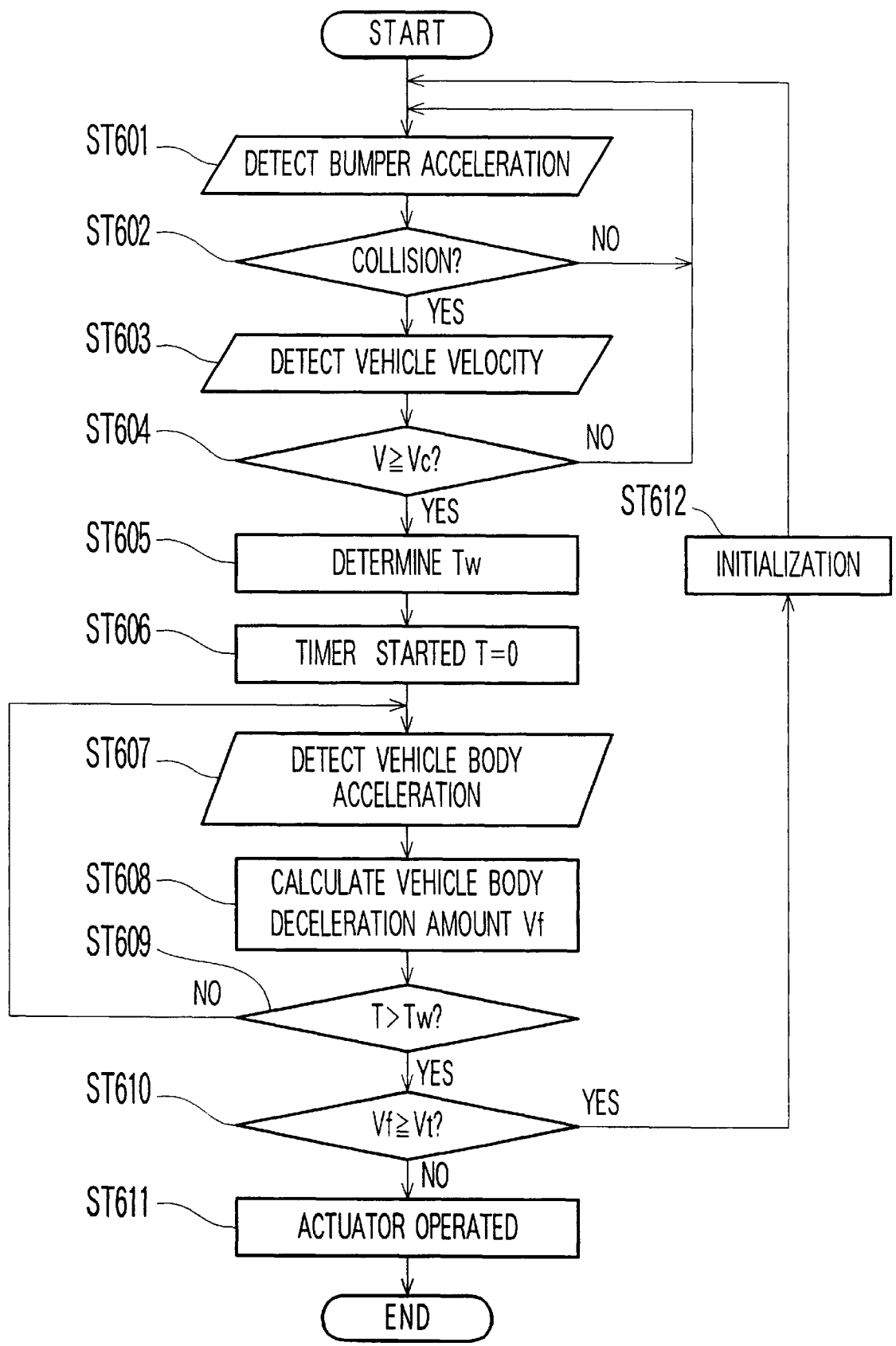
FIG. 24 is a flowchart showing a variation made in the performance shown in the flowchart of FIG. 23.

FIG. 24 is a modification to the flowchart shown in FIG. 23. ST601 to ST608 in FIG. 24 correspond to ST501 to ST508, respectively, in FIG. 23, and no description of those steps is repeated.

After the calculation of the deceleration Vf on the vehicle body at ST608, the length of time T which has elapsed is compared with the predetermined length of time Tw at ST609. If the time T is shorter than Tw, the system returns to ST607, so that the calculation of the deceleration Vf may be continued until the time Tw elapses. If the time T has exceeded Tw, the system proceeds to ST610.

At ST610, the deceleration Vf as found when the time Tw has elapsed is compared with its threshold value Vt. If Vf is lower than Vt, the system proceeds to ST611, so that the actuator 23 may be caused to lift the hood 12. If Vf is equal to, or higher than Vt, the system proceeds to ST612 for the resetting of the unit 62 for calculating the deceleration and the timer 63, and returns to ST601.

The system according to the fifth embodiment can quickly distinguish the collision of the vehicle 10 with a building from its collision with an object to be protected, since it relies for their distinction upon the deceleration acting upon the vehicle body as calculated from the output of the sensor for the acceleration acting upon the bumper and the acceleration acting upon the vehicle body as detected by its sensor 61.

Obviously, various minor changes and modification of the present invention are possible in the light of the above teaching. It is therefore to be understood that within the scope of the appended claims, the invention may be practiced otherwise than as specifically described.

What is claimed is:

1. A vehicle hood operating system comprising:
    a velocity sensor for detecting a velocity of a vehicle;
    an acceleration sensor for detecting acceleration caused by an external force of one of an object to be protected and any other object directed from a front to a back of the vehicle to act upon a bumper;
    a calculation unit for calculating a speed of bumper deformation by converting said acceleration detected by said acceleration sensor to a speed;
    an actuator for raising a hood thereby to protect an object from being damaged; and
    a control unit for controlling said actuator such that said actuator raises said hood when said vehicle velocity detected by said velocity sensor has exceeded a first threshold value, while at the same time, said speed of bumper deformation calculated by said calculation unit has exceeded a second threshold value varying with said vehicle velocity, said second threshold value being set to discriminate the object to be protected from any other object.

2. A system as set forth in claim 1, further including a memory storing a map containing said second threshold value for said speed of bumper deformation relative to said vehicle velocity, said second threshold value in said map increasing with an increase of said vehicle velocity.

3. A vehicle hood operating system comprising:
    a velocity sensor for detecting a velocity of a vehicle;
    an acceleration sensor for detecting acceleration caused by an external force of one of an object to be protected and any other object directed from a front to a back of the vehicle to act upon a bumper;
    a first calculation unit for calculating a speed of bumper deformation by converting said acceleration detected by said acceleration sensor to a speed;
    a second calculation unit for calculating an amount of bumper deformation from said speed calculated by said first calculation unit;
    an actuator for raising a hood thereby to protect an object from being damaged; and
    a control unit for controlling said actuator such that said actuator raises said hood when said vehicle velocity detected by said velocity sensor has exceeded a first threshold value, while at the same time, said bumper deformation amount calculated by said second calculation unit has exceeded a second threshold value varying with said vehicle velocity, said second threshold value being set to discriminate to object to be protected from any other object.

4. A system as set forth in claim 3, further including a memory storing a map containing said second threshold value for said amount of bumper deformation relative to said vehicle velocity, said second threshold value in said map increasing with an increase of said vehicle velocity.

5. A vehicle hood operating system comprising:
    a velocity sensor for detecting a velocity of a vehicle;
    an acceleration sensor for detecting acceleration caused by an external force of one of an object to be protected and any other object directed from a front to a back of the vehicle to act upon a bumper;
    a first calculation unit for calculating a speed of bumper deformation by converting said acceleration detected by said acceleration sensor to a speed;
    a second calculation unit for calculating an amount of bumper deformation from said bumper deformation speed calculated by said first calculation unit;
    an actuator for raising a hood thereby to protect an object from being damaged; and
    a control unit for controlling said actuator such that said actuator raises said hood when said vehicle velocity detected by said velocity sensor has exceeded a first threshold value, while at the same time, said bumper deformation speed calculated by said first calculation unit has exceeded a second threshold value varying with said vehicle velocity and said amount of bumper deformation calculated by said second calculation unit has exceeded a third threshold value varying with said vehicle velocity, said second and third threshold values being set to discriminate the object to be protected from any other object.

6. A system as set forth in claim 5, further including a first memory storing a map containing said second threshold value for said speed of bumper deformation relative to said vehicle velocity, and a second memory storing a map containing said third threshold value for said amount of bumper deformation relative to said vehicle velocity, said second threshold value in said map in said first memory increasing with an increase of said vehicle velocity, while said third threshold value in said map in said memory also increases with an increase of said vehicle velocity.

7. A vehicle hood operating system comprising:

a velocity sensor for detecting a velocity of a vehicle;

a first acceleration sensor for detecting acceleration caused by an external force of one of an object to be protected and any other object directed from a front to a back of the vehicle to act upon a bumper;

a second acceleration sensor for detecting acceleration caused by an external force directed from a front to a back of the vehicle to act upon a vehicle body;

a calculation unit for calculating deceleration acting upon the vehicle body from said acceleration detected by said second acceleration sensor;

a timer designed to start counting when said acceleration acting upon said bumper has reached a predetermined level;

an actuator for raising a hood thereby to protect an object from being damaged; and a control unit controlling said actuator such that said actuator raises said hood when said vehicle velocity detected by said velocity sensor has exceeded a first threshold value, while at the same time, said deceleration calculated by said calculation unit does not exceed a second threshold value, and a length of time varying with said vehicle velocity has elapsed after the start of said timer, said length of time and said second threshold value being set to discriminate the object to be protected from any other object.

8. A system as set forth in claim 7, further including a memory storing a map containing said length of time relative to said vehicle velocity, said time decreasing with an increase of said vehicle velocity.

* * * * *